United States Patent
Shedlock et al.

(10) Patent No.: US 11,156,727 B2
(45) Date of Patent: Oct. 26, 2021

(54) HIGH DQE IMAGING DEVICE

(71) Applicants: Varian Medical Systems, Inc., Palo Alto, CA (US); Varian Medical Systems International AG, Cham (CH)

(72) Inventors: Daniel Shedlock, Knoxville, TN (US); Josh M. Star-Lack, Palo Alto, CA (US); Daniel Morf, Buch am Irchel (CH); Eric Abel, Cupertino, CA (US); Gary F. Virshup, Cupertino, CA (US); Andre Meyer, Zurich (CH); Viktor Steinlin, Otelfingen (CH); Mingshan Sun, Menlo Park, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 477 days.

(21) Appl. No.: 14/874,238

(22) Filed: Oct. 2, 2015

(65) Prior Publication Data

US 2017/0097425 A1 Apr. 6, 2017

(51) Int. Cl.
*G01T 1/20* (2006.01)

(52) U.S. Cl.
CPC .......... *G01T 1/2018* (2013.01); *G01T 1/2002* (2013.01)

(58) Field of Classification Search
CPC ........ G01T 1/20; G01T 1/2018; G01T 1/2002
See application file for complete search history.

(56) References Cited

U.S. PATENT DOCUMENTS

| | | | | |
|---|---|---|---|---|
| 4,855,598 A | * | 8/1989 | Ohgoda | G01T 1/2012 250/582 |
| 4,870,667 A | * | 9/1989 | Brunnett | G01T 1/2018 378/19 |

(Continued)

FOREIGN PATENT DOCUMENTS

| | | |
|---|---|---|
| CN | 1837795 A | 9/2006 |
| CN | 101561505 A | 10/2009 |

(Continued)

OTHER PUBLICATIONS

International Search Report and Written Opinion dated Feb. 16, 2017 for corresponding PCT Patent Application No. PCT/US2016/054472, 5 pages.

(Continued)

*Primary Examiner* — David P Porta
*Assistant Examiner* — Djura Malevic
(74) *Attorney, Agent, or Firm* — Vista IP Law Group, LLP

(57) ABSTRACT

An imaging device includes: a scintillator layer; and an array of photodiode elements; wherein the scintillator layer is configured to receive radiation that has passed through the array of photodiode elements. An imaging device includes: a scintillator layer having a plurality of scintillator elements configured to convert radiation into photons; and an array of photodiode elements configured to receive photons from the scintillator layer, and generate electrical signals in response to the received photons; wherein at least two of the scintillator elements are separated by an air gap. An imaging (Continued)

device includes: a first scintillator layer having a plurality of scintillator elements arranged in a first plane; and a second scintillator layer having a plurality of scintillator elements arranged in a second plane; wherein the first scintillator layer and the second scintillator layer are arranged next to each other and form a non-zero angle relative to each other.

32 Claims, 28 Drawing Sheets

(56) References Cited

U.S. PATENT DOCUMENTS

| | | | | |
|---|---|---|---|---|
| 5,138,167 A * | 8/1992 | Barnes | | G01T 1/2018 250/363.02 |
| 5,440,129 A * | 8/1995 | Schmidt | | G01T 1/2018 250/366 |
| 5,570,403 A * | 10/1996 | Yamazaki | | A61B 6/032 378/19 |
| 5,572,034 A * | 11/1996 | Karellas | | G01T 1/2018 250/367 |
| 5,825,032 A * | 10/1998 | Nonaka | | H04N 5/325 250/370.09 |
| 5,841,832 A * | 11/1998 | Mazess | | A61B 6/032 378/56 |
| 6,178,224 B1 * | 1/2001 | Polichar | | G01N 23/04 250/368 |
| RE37,536 E * | 2/2002 | Barnes | | A61B 6/032 250/361 R |
| 6,445,765 B1 * | 9/2002 | Frank | | A61B 6/032 378/54 |
| 6,473,486 B2 * | 10/2002 | Hoffman | | A61B 6/032 250/367 |
| 6,895,077 B2 * | 5/2005 | Karellas | | A61B 6/481 250/370.09 |
| 6,979,826 B2 * | 12/2005 | Ikhlef | | G01T 1/2018 250/361 R |
| 6,982,423 B2 * | 1/2006 | Elgali | | G01T 1/1648 250/370.11 |
| 7,103,137 B2 * | 9/2006 | Seppi | | G01N 23/04 378/57 |
| 7,122,804 B2 * | 10/2006 | Mollov | | G01T 1/2018 250/370.11 |
| 7,138,632 B2 * | 11/2006 | Yamada | | G01T 1/1603 250/367 |
| 7,259,376 B2 * | 8/2007 | Pohan | | G01T 1/2018 250/370.09 |
| 7,263,165 B2 * | 8/2007 | Ghelmansarai | | A61N 5/1049 250/370.09 |
| 7,405,406 B1 | 7/2008 | Nagarkar et al. | | |
| 7,595,493 B2 * | 9/2009 | Okada | | G21K 4/00 250/367 |
| 7,679,061 B2 * | 3/2010 | Wong | | G01T 1/2002 250/370.08 |
| 7,718,974 B2 * | 5/2010 | Schulz | | G01T 1/20 250/370.11 |
| 7,885,372 B2 * | 2/2011 | Edic | | A61B 6/032 378/158 |
| 7,893,405 B2 * | 2/2011 | Nagano | | G01T 1/2018 250/361 R |
| 7,952,058 B2 * | 5/2011 | Nomura | | G01T 1/2018 250/208.1 |
| 7,968,853 B2 * | 6/2011 | Altman | | A61B 6/032 250/366 |
| 8,304,735 B2 * | 11/2012 | Inoue | | G01T 1/2018 250/361 R |
| 9,040,927 B2 * | 5/2015 | Kawata | | G01T 1/2002 250/366 |
| 9,054,012 B2 * | 6/2015 | Nomura | | H01L 27/14685 |
| 9,140,808 B2 * | 9/2015 | Ronda | | G01T 1/1644 |
| 9,182,504 B2 * | 11/2015 | Nishino | | G01T 1/2018 |
| 9,411,057 B2 * | 8/2016 | Helm | | G01T 1/1612 |
| 9,422,159 B2 * | 8/2016 | Colby | | B82Y 20/00 |
| 9,606,244 B2 * | 3/2017 | Ganguly | | G01T 1/2006 |
| 9,784,853 B2 * | 10/2017 | Nishino | | G01T 1/2018 |
| 10,488,531 B2 * | 11/2019 | Deych | | H01L 27/14634 |
| 2001/0054694 A1 * | 12/2001 | Kusuyama | | G01T 1/2002 250/367 |
| 2002/0020846 A1 * | 2/2002 | Pi | | H01L 27/14643 257/88 |
| 2002/0027201 A1 * | 3/2002 | Agano | | G01V 5/0041 250/370.11 |
| 2002/0153492 A1 * | 10/2002 | Sekine | | G01T 1/2018 250/370.11 |
| 2003/0047697 A1 * | 3/2003 | Iwabuchi | | C09K 11/616 250/584 |
| 2003/0169847 A1 * | 9/2003 | Karellas | | A61B 6/481 378/98.3 |
| 2003/0173493 A1 * | 9/2003 | Homme | | G01T 1/2018 250/200 |
| 2004/0195514 A1 * | 10/2004 | Nagano | | G01T 1/2018 250/370.11 |
| 2004/0232342 A1 | 11/2004 | Aykac et al. | | |
| 2005/0051736 A1 * | 3/2005 | Isoda | | G03B 42/08 250/484.4 |
| 2005/0077479 A1 * | 4/2005 | Isoda | | C09K 11/7733 250/484.4 |
| 2005/0082488 A1 | 4/2005 | Mollov et al. | | |
| 2005/0156113 A1 * | 7/2005 | Suzuki | | G01T 1/2002 250/368 |
| 2005/0167604 A1 | 8/2005 | Suganuma et al. | | |
| 2005/0285044 A1 * | 12/2005 | Mollov | | G01T 1/2018 250/370.11 |
| 2006/0151708 A1 * | 7/2006 | Bani-Hashemi | | G01T 1/2008 250/370.11 |
| 2006/0214109 A1 * | 9/2006 | Bueno | | G01T 1/2018 250/370.11 |
| 2007/0025513 A1 * | 2/2007 | Ghelmansarai | | A61N 5/1049 378/98.8 |
| 2007/0040125 A1 * | 2/2007 | Sato | | H01L 27/14663 250/367 |
| 2007/0051896 A1 * | 3/2007 | Okada | | G01T 1/2018 250/370.11 |
| 2007/0057192 A1 * | 3/2007 | Vogtmeier | | G01T 1/2018 250/370.11 |
| 2007/0114425 A1 * | 5/2007 | Wong | | G01T 1/2002 250/370.09 |
| 2007/0205371 A1 * | 9/2007 | Inoue | | G01T 1/2018 250/370.11 |
| 2007/0205380 A1 * | 9/2007 | Isoda | | C09K 11/7733 250/484.4 |
| 2007/0221858 A1 * | 9/2007 | Abenaim | | G01T 1/2018 250/370.11 |
| 2008/0011959 A1 * | 1/2008 | Thorne | | G01T 1/2018 250/370.09 |
| 2008/0011960 A1 * | 1/2008 | Yorkston | | G21K 4/00 250/370.09 |
| 2008/0245968 A1 * | 10/2008 | Tredwell | | H01L 27/14632 250/370.09 |
| 2008/0253507 A1 * | 10/2008 | Levene | | G01T 1/2018 378/19 |
| 2009/0129115 A1 * | 5/2009 | Fine | | G02B 6/0021 362/606 |
| 2010/0002414 A1 * | 1/2010 | Meir | | G02B 6/0021 362/84 |
| 2010/0301221 A1 * | 12/2010 | Nakamura | | G01T 1/1603 250/366 |
| 2011/0006213 A1 * | 1/2011 | Sato | | G01T 1/2018 250/367 |
| 2011/0180890 A1 * | 7/2011 | Sato | | H01L 27/14601 257/429 |
| 2011/0233411 A1 * | 9/2011 | Nishino | | G01T 1/2018 250/361 R |
| 2011/0255303 A1 * | 10/2011 | Nichol | | G02B 6/006 362/606 |
| 2011/0303849 A1 * | 12/2011 | Tredwell | | G01T 1/2018 250/362 |

(56) References Cited

U.S. PATENT DOCUMENTS

| | | | | |
|---|---|---|---|---|
| 2012/0132812 | A1* | 5/2012 | Fuchs | H01L 31/115 250/361 R |
| 2012/0250819 | A1* | 10/2012 | Yoshida | G01T 7/005 378/4 |
| 2012/0298876 | A1* | 11/2012 | Kaneko | G01T 1/202 250/366 |
| 2013/0026377 | A1* | 1/2013 | Ichimura | G01T 1/202 250/367 |
| 2013/0048864 | A1* | 2/2013 | Nakatsugawa | H01L 27/14618 250/366 |
| 2013/0082264 | A1* | 4/2013 | Couture | G01T 1/2018 257/59 |
| 2013/0083887 | A1* | 4/2013 | Li | H01L 27/14676 378/19 |
| 2013/0126850 | A1* | 5/2013 | Iwakiri | H01L 51/0001 257/40 |
| 2013/0155723 | A1* | 6/2013 | Coleman | G02B 6/0018 362/621 |
| 2013/0256538 | A1* | 10/2013 | Vogtmeier | G01T 1/2008 250/366 |
| 2013/0284934 | A1* | 10/2013 | Kaneko | A61B 6/4216 250/361 R |
| 2014/0049983 | A1* | 2/2014 | Nichol | G02B 6/0018 362/610 |
| 2014/0264043 | A1* | 9/2014 | Ganguly | G01T 1/2006 250/362 |
| 2014/0353513 | A1* | 12/2014 | Partain | G01T 1/1606 250/366 |
| 2014/0361182 | A1* | 12/2014 | Hasegawa | G01T 1/202 250/367 |
| 2015/0060676 | A1* | 3/2015 | Couture | G01T 1/2018 250/366 |
| 2015/0060681 | A1* | 3/2015 | Chappo | G01T 1/2928 250/370.09 |
| 2015/0090887 | A1* | 4/2015 | Chappo | H01L 27/14634 250/362 |
| 2015/0185334 | A1* | 7/2015 | Tredwell | G01T 1/20 250/366 |
| 2015/0253487 | A1* | 9/2015 | Nichol | G02B 6/0036 362/610 |
| 2015/0294998 | A1* | 10/2015 | Nihtianov | H01L 27/14609 257/447 |
| 2016/0116606 | A1* | 4/2016 | Itaya | G01T 1/2023 |
| 2016/0363673 | A1* | 12/2016 | Ahn | G01T 1/2018 |
| 2017/0097425 | A1* | 4/2017 | Shedlock | G01T 1/2018 |
| 2017/0168169 | A1* | 6/2017 | Liu | G01T 7/00 |
| 2018/0203134 | A1* | 7/2018 | Chappo | G01T 1/161 |

FOREIGN PATENT DOCUMENTS

| | | |
|---|---|---|
| CN | 102440794 A | 5/2012 |
| EP | 1705708 A2 | 9/2006 |

OTHER PUBLICATIONS

Extended Search Report dated Jul. 11, 2019 for EP Patent Application No. EP 16852603.6.
Supplementary Partial European Search Report dated Apr. 10, 2019 for EP Patent Application No. EP 16852603.6.
Examination Report dated Jun. 23, 2020 for EP Patent Application No. EP 16852603.6.
Office Action dated Jun. 29, 2021 for corresponding Chinese Patent Application No. 201680070933.5.
Examination Report dated Jun. 15, 2021 for corresponding EP Patent Application No. EP 16852603.6.

* cited by examiner

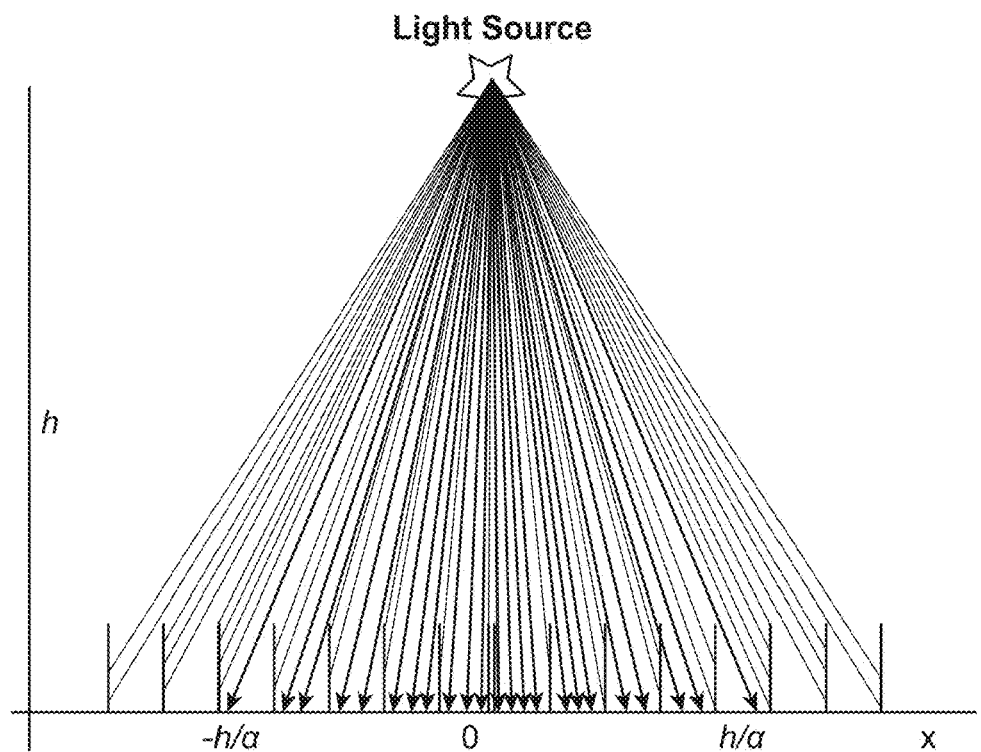
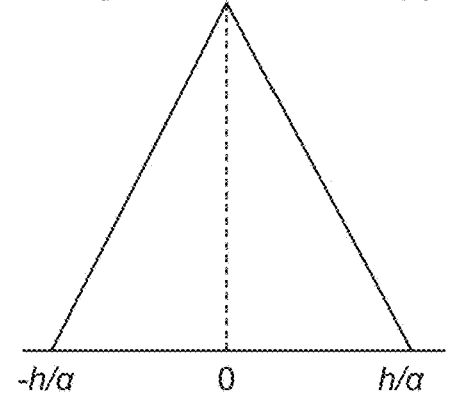
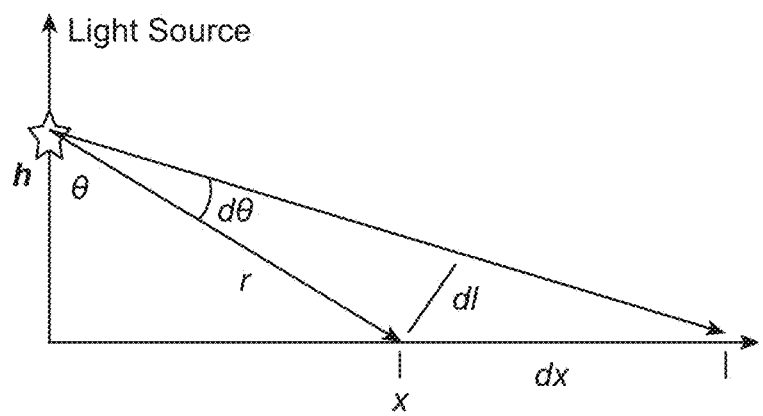
FIG. 12
FIG. 13

HIGH DQE IMAGING DEVICE

FIELD

The field of the application relates to imaging devices, and more particularly to medical imaging devices.

BACKGROUND

Imaging devices, such as an x-ray imager, have been used for diagnostic and treatment purposes. One type of x-ray imager is a diagnostic imager configured to operate with a diagnostic radiation source. Another type of x-ray imager is a high DQE detector that is configured for use with a treatment radiation source. An x-ray imager may also be configured for use with both diagnostic radiation beam and treatment radiation beam.

Creating a high DQE detector for portal imaging presents a significant technical challenge. One approach uses thick pixilated scintillator arrays that are coupled to an electronic portal imaging device (EPID). Incoming x-ray photons deposit energy into the scintillators which then produce optical photons via luminescence. These optical photons, which originate with random polarizations and direction vectors after the luminescence events, are transported throughout the scintillator during which time they can be reflected, refracted and scattered. Eventually, many photons will cross the boundary between the scintillator and the EPID to be absorbed by the EPID's photodiodes and converted into electrical current for readout and digitization. Despite the promise of the technology, performance may be inadequate and a significant manufacturing cost lies in the process of cutting the crystalline scintillators into parallelepipeds and gluing reflective septa between them in order to reduce optical cross talk.

Also, in some cases, an x-ray imager (e.g., a diagnostic x-ray imager or a portal imager) may comprise a scintillator coupled to a photodiode array. X-ray photons deposit energy into the scintillator thereby producing optical photons with random direction and polarization vectors. A percentage of these optical photons will cross the scintillator-photodiode boundary and deposit energy. The photodiodes convert optical photons into electron-hole pairs. After a sufficient amount of charge is collected, signals are read out and digitized to form an image. To achieve a sufficiently high spatial resolution, optical blurring is desired to be minimized. This implies that the photodiode signals associated with a given x-ray photon should be localized in close lateral proximity to where that x-ray photon interacted with the scintillator. A common means of achieving this goal is through the use of pixelated geometries that confine optical photons using reflective septa. Unfortunately, this approach suffers from high manufacturing costs and may not be practical for incorporating into large-area imagers. As similarly discussed, the process of cutting the crystalline scintillators (e.g. CsI, CdWO4, BGO) into parallelepipeds, gluing reflective septa between them, and then assembling the pixels into a complete array, may be very expensive. Another disadvantage of the pixelated geometry is the loss of fill factor (and associated quantum efficiency) due to the finite thickness of the septa.

Applicant of the subject application determines that it may be desirable to have new imaging devices which (1) have improved frequency-dependent detective quantum efficiency (DQE(f)), (2) do not require scintillator to be pixelated, (3) are less costly to manufacture, or (4) combination of the foregoing.

SUMMARY

An imaging device includes: a scintillator layer; and an array of photodiode elements; wherein the scintillator layer is configured to receive radiation that has passed through the array of photodiode elements.

Optionally, the scintillator layer is configured to generate optical photons in response to the received radiation, and the photodiode elements are configured to generate electrical signals in response to the optical photons.

Optionally, the imaging device further includes a glass substrate, wherein the array of detector elements is secured to the glass substrate, wherein the glass substrate has a first side and an opposite second side, the first side being closer to a radiation source than the second side.

Optionally, the array of detector elements is located closer to the first side of the glass substrate than the second side.

Optionally, the array of detector elements is located closer to the second side of the glass substrate than the first side.

Optionally, the imaging device further includes a layer of focusing elements located between the array of photodiode elements and the scintillator layer.

Optionally, the layer of focusing elements comprises a fiber optic array.

Optionally, one or more sides of the scintillator layer are beveled.

Optionally, the layer of focusing elements comprises a brightness enhancement film (BEF).

Optionally, the imaging device further includes an additional scintillator layer, wherein the array of photodiode elements is located between the scintillator layer and the additional scintillator layer.

Optionally, the scintillator layer comprises an array of scintillator elements, and at least two of the scintillator elements are separated by an air gap.

Optionally, the air gap extends from a first side of the scintillator layer to a second side of the scintillator layer.

Optionally, the at least two of the scintillator elements are separated by an additional air gap, wherein the air gap extends from a first side of the scintillator layer, and the additional air gap extends from a second side of the scintillator layer.

Optionally, the scintillator layer comprises an array of scintillator elements, and at least two of the scintillator elements are separated by a wall that is configured to reflect photons. The wall may be a metal wall, a specular reflector, a diffuse reflector, a device with a variation in index of refraction to induce total internal reflection, or any combination thereof.

Optionally, the wall has a photon-reflectivity that varies through a thickness of the scintillator layer.

Optionally, the scintillator layer comprises a first scintillator portion with a first index of refraction, and a second scintillator portion with a second index of refraction that is different from the first index of refraction.

Optionally, the imaging device further includes an additional scintillator layer having a plurality of scintillator elements, wherein the scintillator layer has a first plane and the additional scintillator layer has a second plane, and the scintillator layer and the additional scintillator layer are arranged next to each other so that the first plane and the second plane form a non-zero angle relative to each other.

Optionally, the photodiode elements are arranged in a flat plane, and wherein the imaging device further comprises fiber optics coupling the respective scintillator elements in the scintillator layer and in the additional scintillator layer to the respective photodiode elements.

Optionally, the scintillator layer is non-pixelated.

Optionally, the imaging device further includes an optical grid coupled to the scintillator layer.

Optionally, the optical grid comprises a one-dimensional grid.

Optionally, the optical grid comprises a two-dimensional grid.

Optionally, the optical grid comprises reflecting walls or a device with a variation in index of refraction for internal reflection.

Optionally, the optical grid comprises metalized mylar.

Optionally, the optical grid comprises a material that has an optical reflecting property.

Optionally, the imaging device further includes a plate coupled to the scintillator layer.

An imaging device includes: a scintillator layer having a plurality of scintillator elements configured to convert radiation into photons; and an array of photodiode elements configured to receive photons from the scintillator layer, and generate electrical signals in response to the received photons; wherein at least two of the scintillator elements are separated by an air gap. In some cases, the air gap may provide a change in the index of refraction for internal reflection.

Optionally, the air gap extends from a first side of the scintillator layer to a second side of the scintillator layer.

Optionally, the at least two of the scintillator elements are separated by an additional air gap, wherein the air gap extends from a first side of the scintillator layer, and the additional air gap extends from a second side of the scintillator layer.

Optionally, the scintillator layer comprises a first scintillator portion with a first index of refraction, and a second scintillator portion with a second index of refraction that is different from the first index of refraction.

Optionally, the imaging device further includes a layer of focusing element(s) located between the array of photodiode elements and the scintillator layer.

Optionally, the layer of focusing element(s) comprises a fiber optic array.

Optionally, the layer of focusing element(s) comprises a brightness enhancement film (BEF).

Optionally, the scintillator layer is configured to receive radiation that has passed through the array of photodiode elements.

Optionally, the scintillator layer is configured to receive radiation before the array of photodiode elements.

Optionally, the imaging device further includes an additional scintillator layer having a plurality of scintillator elements, wherein the scintillator layer has a first plane and the additional scintillator layer has a second plane, and the scintillator layer and the additional scintillator layer are arranged next to each other so that the first plane and the second plane form a non-zero angle relative to each other.

Optionally, the photodiode elements are arranged in a flat plane, and wherein the imaging device further comprises fiber optics coupling the respective scintillator elements in the scintillator layer and in the additional scintillator layer to the respective photodiode elements.

Optionally, the imaging device further includes a plate coupled to the scintillator layer.

An imaging device includes: a first scintillator layer having a plurality of scintillator elements arranged in a first plane; and a second scintillator layer having a plurality of scintillator elements arranged in a second plane; wherein the first scintillator layer and the second scintillator layer are arranged next to each other and form a non-zero angle relative to each other.

Optionally, the imaging device further includes an array of photodiode elements coupled to the first scintillator layer and the second scintillator layer.

Optionally, the first scintillator layer and the second scintillator layer are configured to receive radiation that has passed through the array of photodiode elements.

Optionally, the first scintillator layer and the second scintillator layer are configured to receive radiation before the array of photodiode elements.

Optionally, the photodiode elements are arranged in a flat plane.

Optionally, the imaging device further includes fiber optics coupling the respective scintillator elements in the first scintillator layer and in the second scintillator layer to the respective photodiode elements.

Optionally, the first scintillator layer is non-pixelated.

Optionally, the imaging device further includes an optical grid coupled to the first scintillator layer.

Optionally, the optical grid comprises a one-dimensional grid.

Optionally, the optical grid comprises a two-dimensional grid.

Optionally, the optical grid comprises reflecting walls or a device with a variation in index of refraction for internal reflection.

Optionally, the optical grid comprises metalized mylar. The optical grid may be any optical reflector that can induce the transport of light.

Optionally, the imaging device further includes an attenuating material located between the first scintillator layer and the second scintillator layer.

Optionally, at least two of the scintillator elements in the first scintillator layer are separated by an air gap.

Optionally, at least two of the scintillator elements in the first scintillator layer are separated by a wall that is configured to reflect photons. The wall may be a metal wall, a specular reflector, a diffuse reflector, or any combination thereof.

Optionally, the wall has a photon-reflectivity that varies through a thickness of the scintillator layer.

An imaging device includes: a non-pixelated scintillator layer configured to receive radiation and generate photons in response to the radiation; an array of photodiode elements configured to generate electrical signals in response to the photons; and an optical grid located between the non-pixelated scintillator layer and the array of photodiode elements.

Optionally, the optical grid comprises a one-dimensional grid.

Optionally, the optical grid comprises a two-dimensional grid.

Optionally, the optical grid comprises reflecting walls or a device with a variation in index of refraction for internal reflection.

Optionally, the optical grid comprises metalized mylar.

Optionally, the scintillator layer is configured to receive radiation that has passed through the array of photodiode elements.

Optionally, the scintillator layer is configured to receive radiation before the array of photodiode elements.

Optionally, the imaging device further includes an additional non-pixelated scintillator layer, and an additional optical grid, wherein the additional non-pixelated scintillator layer and the additional optical grid are located between the optical grid and the array of photodiode elements.

Optionally, the optical grid and the additional optical grid have different respective grid pitches.

Optionally, the scintillator layer has a first index of refraction, and the optical grid has a second index of refraction that is less than the first index of refraction.

Optionally, the imaging device further includes an additional scintillator layer, wherein the array of photodiode elements is located between the scintillator layer and the additional scintillator layer.

An imaging device includes: a first scintillator layer; an array of photodiode elements; and a first optical filter coupled between the first scintillator layer and the array of photodiode elements, the first optical filter having a plurality of filter openings for passage of light there through; wherein a spacing between two of the filter openings that are adjacent to each other is different from a spacing between two of the photodiode elements that are adjacent to each other.

Optionally, the first optical filter comprises a rear projection foil.

Optionally, the first optical filter comprises a prism structure.

Optionally, the first optical filter comprises a plurality of optical fibers.

Optionally, at least one of the optical fibers is located in one of the filter openings.

Optionally, the imaging device further includes a second optical filter located between the first optical filter and the array of photodiode elements.

Optionally, the imaging device further includes a substrate, wherein the first optical filter is coupled to a first side of the substrate, and the second optical filter is coupled to a second side of the substrate, the second side of the substrate being opposite from the first side of the substrate.

Optionally, the imaging device further includes a second scintillator layer; wherein the second scintillator layer is configured to receive radiation from a radiation source, and generate light in response to the radiation for detection by a first side of the array; and wherein the first scintillator layer is configured to receive radiation exited from the second scintillator layer, and generate light in response to the radiation exited from the second scintillator layer for detection by a second side of the array that is opposite from the first side of the array.

An imaging device includes: an array of photodiode elements; a capillary array having a plurality of capillaries, the capillary array located in an operative position with respect to the array of photodiode elements; and scintillator blocks located in respective capillaries; wherein the scintillator blocks comprise a first scintillator block and a second scintillator block, and wherein the capillary array has a wall between the first and second scintillator blocks for preventing light generated in the first scintillator block from reaching the second scintillator block.

Optionally, a spacing between two of the capillaries that are adjacent to each other is different from a spacing between two of the photodiode elements that are adjacent to each other.

Optionally, a spacing between two of the capillaries that are adjacent to each other is equal to a spacing between two of the photodiode elements that are adjacent to each other.

An imaging device includes: a scintillating layer configured to generate light in response to radiation; and a detector coupled to the scintillating layer, wherein the detector is configured to generate electrical signals in response to the light; wherein the scintillating layer comprises an oxyhalide material.

Optionally, the oxyhalide material is in a form of glass.

Optionally, the scintillating layer comprises a slab made from the oxyhalide material.

Optionally, the imaging device further includes a grid disposed between the scintillating layer and the detector.

Optionally, the scintillating layer comprises a grid having grid walls, and the oxyhalide material is disposed between two of the grid walls.

Other and further aspects and features will be evident from reading the following detailed description.

DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

FIG. 12 shows that grid shadowing leads to a triangular distribution of detected photons.

FIG. 13 shows reduction in intensity of photons crossing an x-axis as x increases due to geometrical factors.

DETAILED DESCRIPTION

Figure 1:
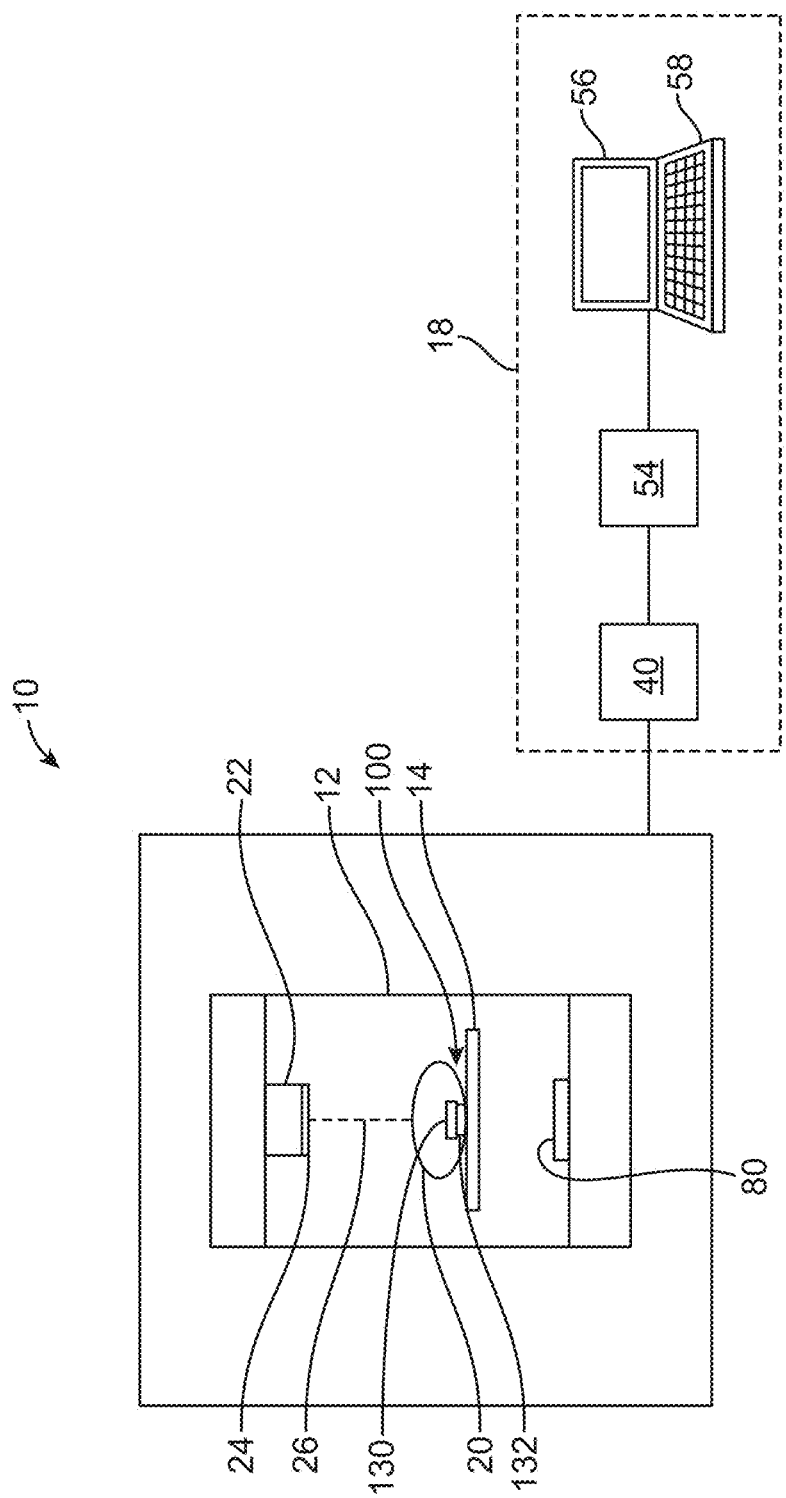
FIG. 1 illustrates a radiation system having an imaging device in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a radiation treatment system 10. The system 10 includes an arm gantry 12, a patient support 14 for supporting a patient 20, and a control system 18 for controlling an operation of the gantry 12 and delivery of radiation. The system 10 also includes a radiation source 22 that projects a beam 26 of radiation towards the patient 20 while the patient 20 is supported on support 14, and a collimator system 24 for changing a cross sectional shape of the radiation beam 26. The radiation source 22 may be configured to generate a cone beam, a fan beam, or other types of radiation beams in different embodiments. Also, in other embodiments, the source 22 may be configured to generate proton beam as a form of radiation for treatment purpose. Also, in other embodiments, the system 10 may have other form and/or configuration. For example, in other embodiments, instead of an arm gantry 12, the system 10 may have a ring gantry 12.

In the illustrated embodiments, the radiation source 22 is a treatment radiation source for providing treatment energy. In other embodiments, in addition to being a treatment radiation source, the radiation source 22 can also be a diagnostic radiation source for providing diagnostic energy for imaging purposes. In such cases, the system 10 will include an imager, such as the imager 80, located at an operative position relative to the source 22 (e.g., under the support 14). In further embodiments, the radiation source 22 may be a treatment radiation source for providing treatment energy, wherein the treatment energy may be used to obtain images. In such cases, in order to obtain imaging using treatment energies, the imager 80 is configured to generate images in response to radiation having treatment energies (e.g., MV imager). Also, in some embodiments, the imager 80 may be a portal imager configured to perform portal imaging. In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 22 is able to generate X-ray radiation at a plurality of photon energy levels. For example, the accelerator may have an energy range from 1 MV to 20 MV, producing an x-ray having a range from 10 kV to 160 kV. In other cases, the energy may have a range anywhere between approximately 10 keV and approximately 20 MeV. In further embodiments, the radiation source 22 can be a diagnostic radiation source. In such cases, the system 10 may be a diagnostic system with one or more moving parts. In the illustrated embodiments, the radiation source 22 is carried by the arm gantry 12. Alternatively, the radiation source 22 may be located within a bore (e.g., coupled to a ring gantry).

In the illustrated embodiments, the control system 18 includes a processing unit 54, such as a processor, coupled to a control 40. The control system 18 may also include a monitor 56 for displaying data and an input device 58, such as a keyboard or a mouse, for inputting data. The operation of the radiation source 22 and the gantry 12 are controlled by the control 40, which provides power and timing signals to the radiation source 22, and controls a rotational speed and position of the gantry 12, based on signals received from the processing unit 54. Although the control 40 is shown as a separate component from the gantry 12 and the processing unit 54, in alternative embodiments, the control 40 can be a part of the gantry 12 or the processing unit 54.

In some embodiments, the system 10 may be a treatment system configured to deliver treatment radiation beam towards the patient 20 at different gantry angles. During a treatment procedure, the source 22 rotates around the patient 20 and delivers treatment radiation beam from different gantry angles towards the patient 20. While the source 22 is at different gantry angles, the collimator 24 is operated to change the shape of the beam to correspond with a shape of the target tissue structure. For example, the collimator 24 may be operated so that the shape of the beam is similar to a cross sectional shape of the target tissue structure. In another example, the collimator 24 may be operated so that different portions of the target tissue structure receive different amount of radiation (as in an IMRT procedure).

Imaging Device with Reverse Geometry

Figure 2A:
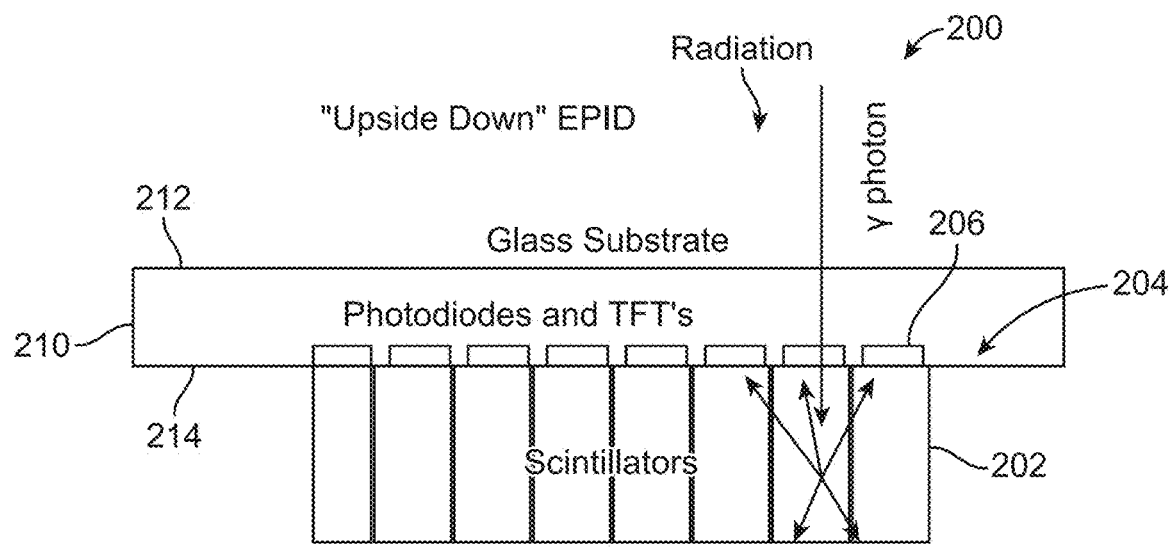
FIG. 2A illustrates an imaging device in accordance with some embodiments where radiation passed through the amorphous silicon (A-Si) glass before the scintillator.

The imager 80 may have different configurations in different embodiments. FIG. 2A illustrates an imaging device 200 in accordance with some embodiments. The imaging device 200 may be used to implement the imager 80 in some embodiments. The imaging device 200 includes a scintillator layer 202 and an array 204 of photodiode elements 206. In this specification, the term "photodiode element" refers to one or more electrical circuit element(s) on a detector pixel that are associated with converting photon energy into electrical signals. This can include, but is not limited to, photodiode(s), switching transistor(s), amplification transistor(s), direct conversion, or a combination thereof. The scintillator layer 202 is configured to receive radiation and generate photons in response to the radiation. The photodiode elements 206 are configured to generate electrical signals in response to the photons provided from the scintillator layer 202. The electrical signals are then read out and digitized to form an image. In the illustrated embodiments, the imaging device 200 also includes a glass substrate 210, and the photodiode elements 206 are coupled to the glass substrate 210. The photodiode elements 206 may be completely embedded in the glass substrate 210. Alternatively, the photodiode elements 206 may be partially embedded in the glass substrate 210. Also, in other embodiments, the photodiode elements 206 may be secured to a surface of the glass substrate 210.

In the illustrated embodiments, the glass substrate 210 has a first side 212, and an opposite second side 214, and the photodiode elements 206 are located closer to the second side 214 than the first side 212. This configuration is advantageous because the photodiode elements 206 are in close proximity to the scintillator layer 202, so that photons leaving the scintillator layer 202 can be immediately received by the photodiode elements 206. The advantage comes from the fact that radiation is entering from the reverse direction with respect to the typical imaging scenario as described below.

In the illustrated embodiments, the scintillator layer 202 has a plurality of scintillator elements. Thus, the scintillator layer 202 is pixelated. In some embodiments, the scintillator elements may be separated by septa, which are located between adjacent scintillator elements. The septa may be comprised of plastic material(s), paint(s), or film(s) of one or more dielectric layers such as Vikuiti™, that offers specular reflection, Lambertian reflection, or change in index of refraction or any combination thereof In some cases, metalized (e.g., aluminized) mylar may be used to implement the septa. In other embodiments, septa may be disposed between adjacent scintillator elements. The septa may offer specular reflection. The fill factor is defined as the total scintillating area divided by the total area of the imaging array. Reducing the thickness of the septa will increase the fill factor of the imaging array. The septa may be deposited onto the sides of the slabs (from microns to nanometers of thickness) to increase the fill factor in some embodiments. Also, in some embodiments, the reflectivity of the septa between adjacent scintillator elements may be graduated, so that the septa are more reflective on one side towards the photodiode elements. In further embodiments, isolation may be tailored to reduce noise aliasing. In still further embodiments, air septa may be disposed between adjacent scintillator elements. Air septa, change in index of refraction for isolating scintillator elements, will be discussed in further detail below. Also, in other embodiments, the scintillator layer 202 may be non-pixelated. In such cases, the scintillator material is continuous across the plane of the imaging device, and there are no scintillator elements that are isolated or confined by reflective septa (wall) or air septa. Septa-less detectors will be described in further detail below.

During use of the imaging device 200, the imaging device 200 is positioned so that the first side 212 of the glass substrate 210 receives radiation from the radiation source 22 before the second side 214. The radiation passes through the glass substrate 210 including the photodiode elements 206, and reaches the scintillator layer 202. The scintillator layer 202 receives the radiation and generates photons in response to the received radiation. The photons from the scintillator layer 202 travel backward towards the direction of the radiation, and reach the respective photodiode elements 206. The photodiode elements 206 generate electrical signals (imaging signals) in response to the photons detected by the respective photodiode elements 206. The imaging signals may be transmitted to a device, such as a processor for imaging, and/or to a medium for storage.

Figure 2B:
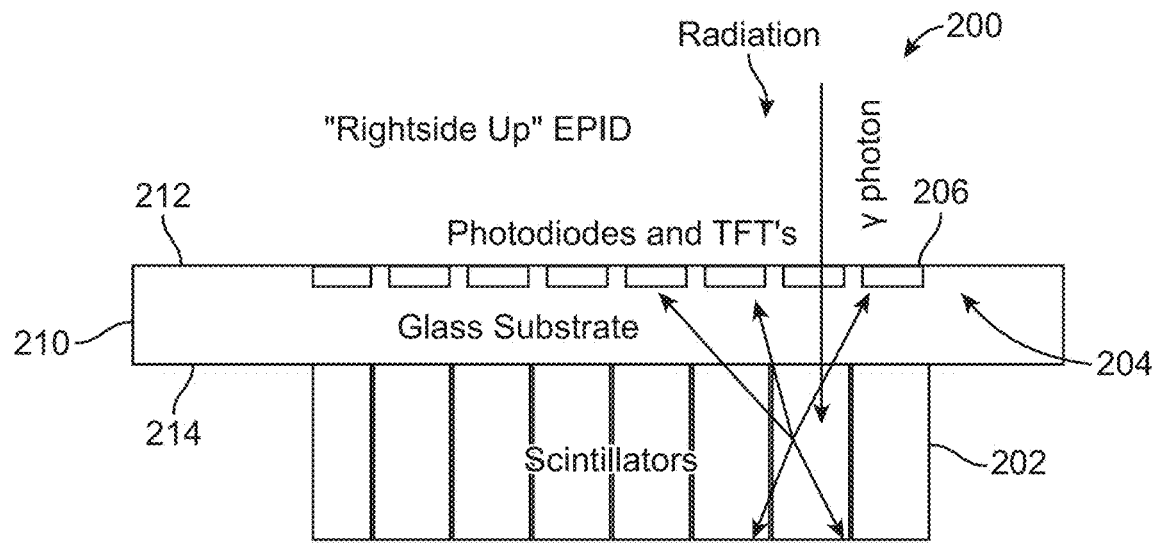
FIG. 2B illustrates an imaging device in accordance with some embodiments where radiation passed through the amorphous silicon glass before the scintillator.

In other embodiments, the photodiode elements 206 may be located closer to the first side 212 than the second side 214 (FIG. 2B). In this configuration, a photon from a certain one of the scintillator elements may travel at a certain angle so that the photon is not received by the photodiode element 206 that corresponds (e.g., aligned) with the scintillator element, but is instead received by an adjacent photodiode element 206. Thus, the resulting image may be relatively more blurry compared to an image generated by the device of FIG. 2A.

Figure 2C:
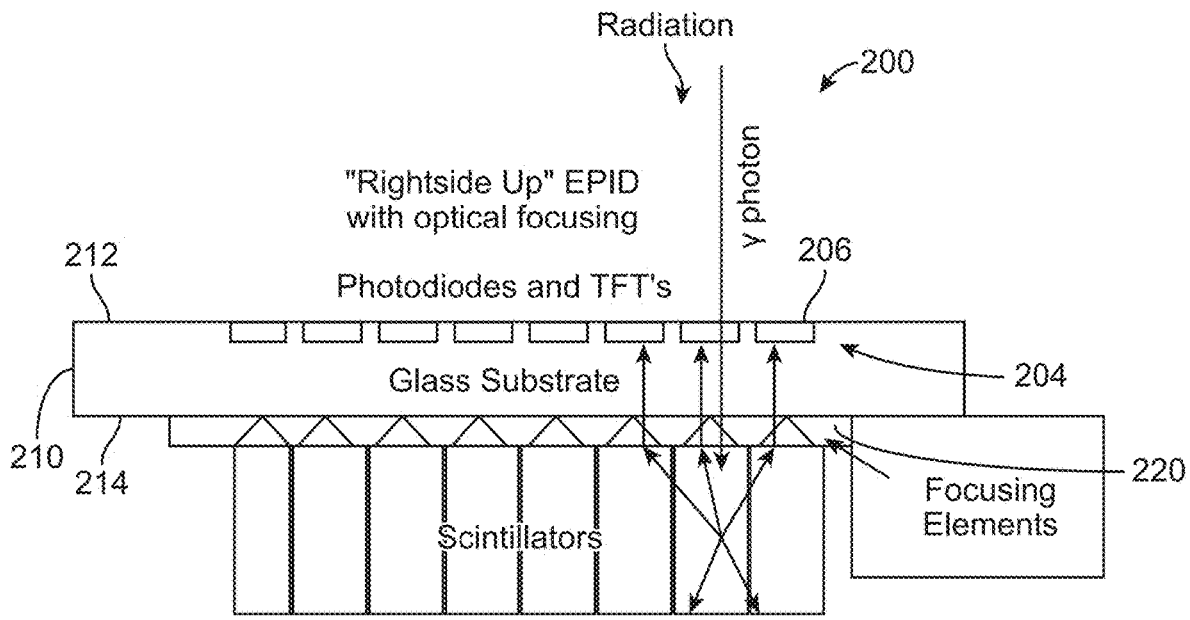
FIG. 2C illustrates an imaging device in accordance with some embodiments where radiation passed through the amorphous silicon glass before the scintillator.

In some embodiments, the clarity of the image from the device of FIG. 2B may be improved using focusing elements that direct photons from the scintillator elements to their respective photodiode elements 206. For example, as shown in FIG. 2C, in some embodiments, the imaging device 200 may optionally further include a layer of focusing elements 220 between the scintillator layer 202 and the array 204 of photodiode elements 206. The focusing elements 220 are configured to direct photons from the scintillator layer 202 to respective photodiode elements 206. By means of non-limiting examples, the focusing elements 220 may be implemented using fiber optics, a thin film such as Vikuiti™ Brightness Enhancement Film (BEF), or any optical device that is capable of channeling optical rays (e.g., using Fresnel refraction and/or reflection).

Figure 2D:
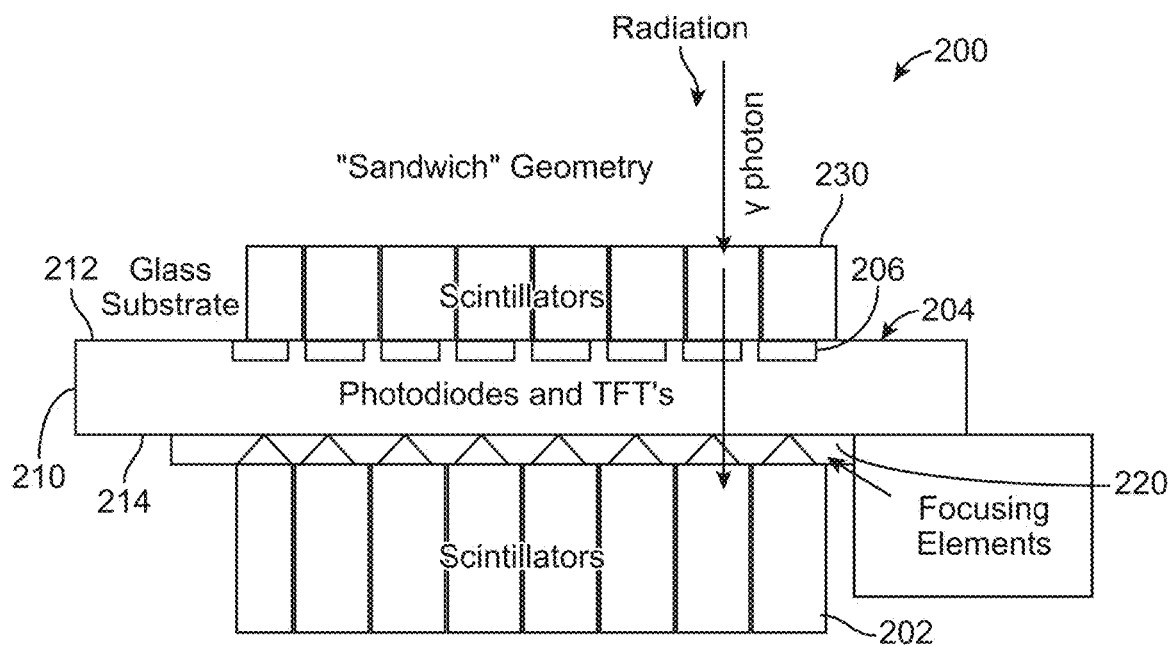
FIG. 2D illustrates an imaging device in accordance with some embodiments.

In some embodiments, the imaging device 200 may optionally further include an additional scintillator layer. For example, as shown in FIG. 2D, the imaging device 200 may optionally include an additional scintillator layer 230, wherein the photodiode elements 206 are located between the scintillator layer 202 and the additional scintillator layer 230. The scintillator layers 202, 230 may be selectively chosen to fit the required imaging tasks. For example, the top scintillator layer 230 may be copper and Lanex™. while the bottom scintillator layer 202 may be $CdWO_4$, CsI, or BGO.

Although the additional scintillator layer 230 is illustrated with reference to the device of FIG. 2D, it should be noted that the additional scintillator layer 230 may be incorporated in one or more of the embodiments of the imaging device 200 described herein. For example, in some embodiments, the imaging device 200 of FIG. 2A may optionally include the additional scintillator layer 230, like that shown in FIG. 2D.

The above embodiments illustrate a reverse geometry, which is advantageous because it reduces Swank noise and increases the number of photons that are detected by the photodiode elements.

Swank noise is a limiting factor in the performance of energy-integrating detectors, such as those for portal imaging. The Swank factor, which may range in value from 0.0 to 1.0, is a measure of how close the DQE of the imager could be to the ideal case of photon counting, with each photon given the same weight. Swank noise may be caused by the different signal amplitudes given by different x-ray photons that constitute a beam spectrum. Because higher energy photons produce larger signals than lower energy photons, the resulting noise may be higher than what would result if 1-bit photon-counting were employed.

The zero-frequency detective quantum efficiency DQE(0) may be given by the total Swank factor multiplied by the zero-frequency quantum detective efficiency (QDE(0)): DQE(0)=QDE(0)*Swank Factor. The Swank factor may be calculated from a received pulse height spectrum using the following relation: Swank Factor=$M1^2$/($M0 \times M2$), where M0, M1, and M2 are the zero, first, and second moments of the pulse height spectrum respectively. The total Swank factor for an indirect energy-integrating detector comprises three components: 1) a beam Swank factor, 2) a radiative Swank factor, and 3) an optical Swank factor.

Figure 3A:
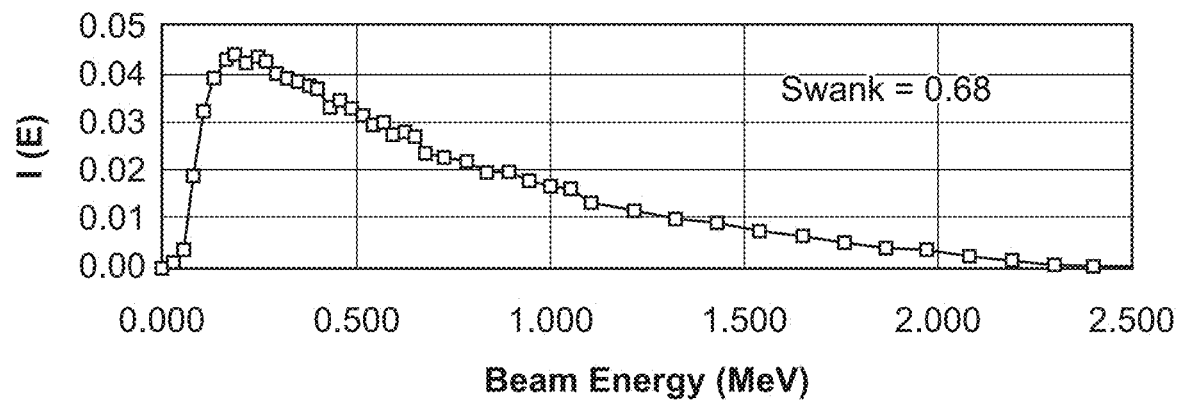
FIG. 3A shows a Monte Carlo simulation of a Bremsstrahlung spectrum produced by 2.5 MeV electrons impacting a transmission copper target.

FIG. 3A shows a Monte Carlo simulation of a Bremsstrahlung spectrum produced by 2.5 MeV photons impacting a transmission copper target. The spectrum has been hardened through 20 cm of water. This spectrum has an inherent Swank factor of 0.68, which means that even if a perfect energy-integrating detector were employed, the DQE (0) could be no higher than 0.68.

Figure 3B:
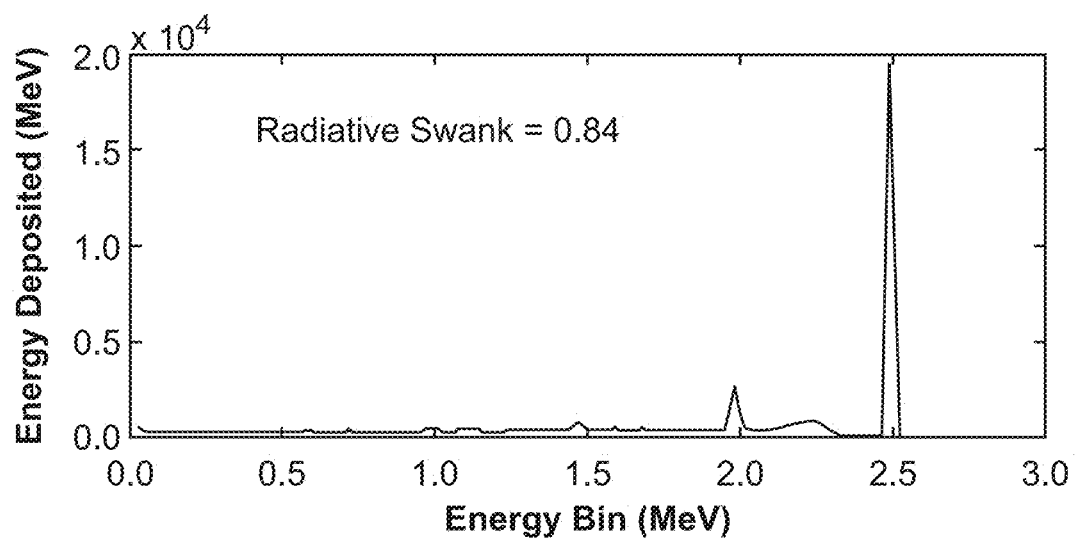
FIG. 3B shows Monte Carlo simulations results, illustrating detector response to a mono-energetic source.

DQE may be further degraded by radiative and optical Swank factors. FIG. 3B shows the pulse height spectrum produced by a 2.5 MeV monoenergetic x-ray beam directed into a 4 cm thick CsI scintillator. The pulse height spectrum reflects deposited energy in the crystal. The result shows that for this set of conditions, the radiative Swank factor is 0.84 yielding a combined beam and radiative Swank factor of 0.57.

Figure 3C:
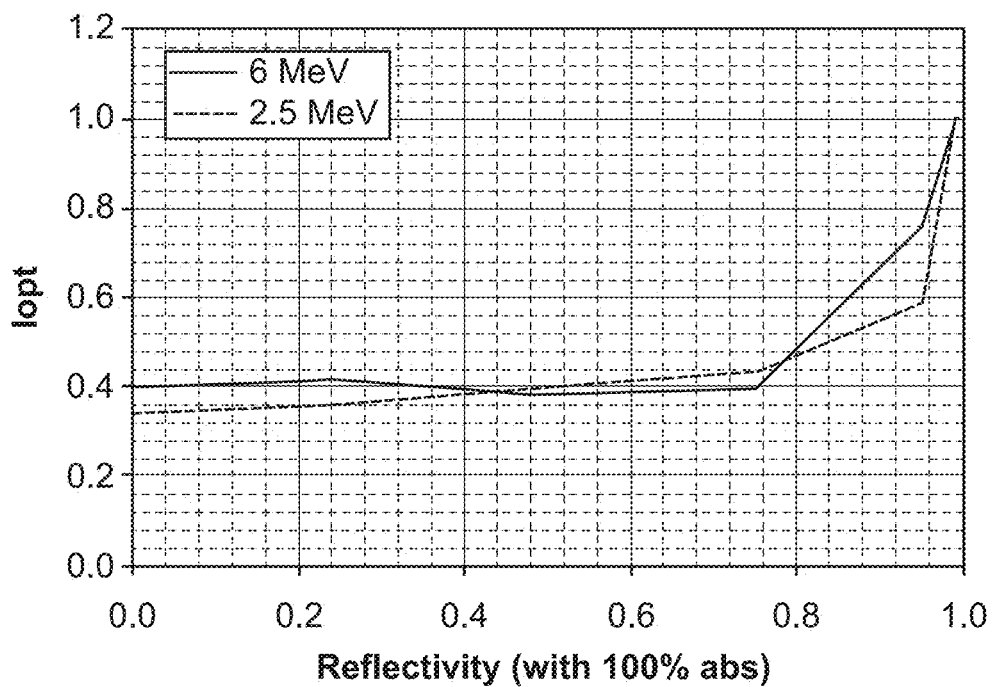
FIG. 3C illustrates optical Swank factors plotted as a function of wall reflectivity.

The optical Swank factor depends on the light transport properties through the scintillator structure. In the case of perfectly reflective septa and no light absorption in the crystals, the optical Swank factor is 1.0, and hence, no further Swank-related SNR degradations are incurred beyond those due to the beam and radiative deposition processes. Optical photons may either be absorbed by or transmitted through the septa walls (walls between the imaging elements), and scattered, or absorbed by the crystal. These processes may significantly reduce the Swank factors as illustrated in FIG. 3C, which shows Monte Carlo simulations of DQE(0) as a function of septa wall reflectivity. For these simulations, a 4 cm thick CsI array with 1 mm pixel pitch was used, and septa wall reflection was assumed to be specular. Any optical photons that were not reflected were assumed to be completely absorbed by the septa walls. As shown in the figure, there is a dramatic drop in SNR once the reflectivity reaches a value below 95%.

The results shown in FIGS. 3A-3C indicate that to minimize, or at least reduce, Swank noise, it may be desirable to use specular (mirror) reflectors around each scintillator element with high optical reflectivities, and to use polished rather than ground surfaces. It should be noted that results using Lambertian reflection are not shown, but may be significantly worse. Choosing between a specular and Lambertian reflector depends on the application. For example, Lambertian reflectors are more appropriate with lower height to area aspect ratios. In practice, it may be difficult to find cost-effective reflectors that have a reflectivity above 95%. Accordingly, other means to increase the Swank factor may be desirable.

To eliminate Swank noise, all x-ray photons constituting the spectrum should yield the same electronic signal independent of their energies. It has been discovered that the reverse geometry of the imaging device (such as the embodiments shown in FIGS. 2A-2D) enables the energy-integrating detector to behave more in such manner. In the forward (i.e., standard) geometry, the scintillator layer is situated between the x-ray beam and the photodiode array which converts optical photons to electrical signals. In the reverse geometry, the x-ray beam passes through the photodiode array (which may be low attenuating) before interacting with the scintillator layer. It has been discovered that many more optical photons from the scintillator layer reach the photodiode array using the reverse geometry than using the forward geometry.

More importantly, the reverse geometry has the effect of making received signal from a low energy gamma photon to be on par with the received signal from a higher energy gamma. This equalizing effect results from the fact that the higher energy gamma photon, which produces more optical photons, is deposited further away from the photodiode than the lower energy gamma photon which produces less optical photons. Thus, by the time the optical photons from the higher energy gamma reach the photodiode, a sufficient number have been absorbed by the septa walls to make the final received signal to be on par with the received signal from the low energy gamma (whose optical photons did not have to travel so far to reach the photodiode array).

Figure 4A:
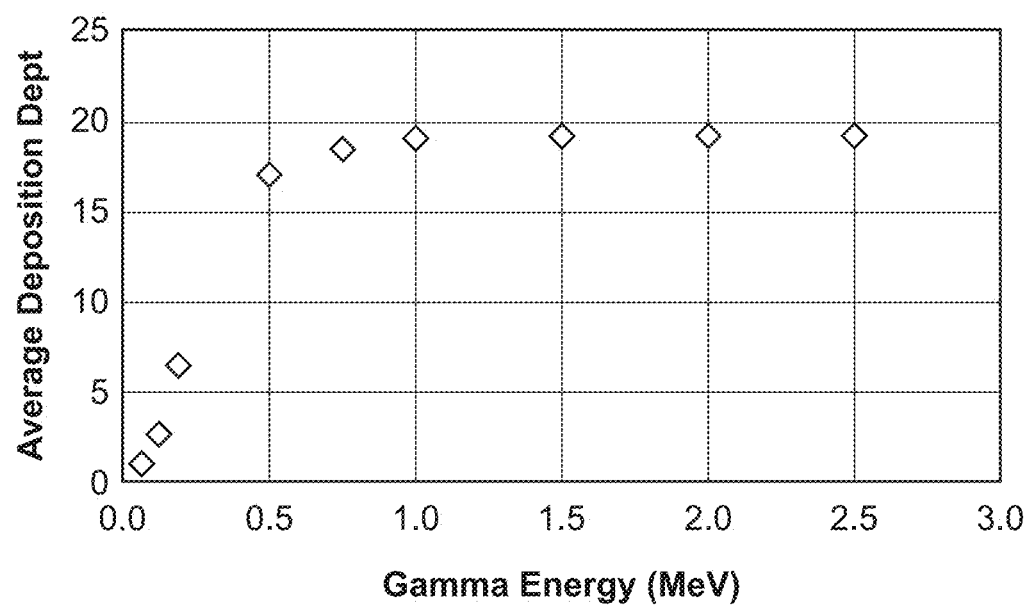
FIG. 4A illustrates average energy deposition depth for different mono-energetic photons directed into a 40 mm thick CsI crystal.

FIG. 4A shows the average energy deposition depth for different mono-energetic photons directed into a 40 mm thick CsI crystal as determined by Monte Carlo simulations. As shown in the figure, the lower energy photons are deposited closer to the entrance side of the scintillator. FIGS. 4B-4E show the results from Monte Carlo simulations using a 2.5 MeV (maximum energy) polychromatic beam, a CsI crystal array of 40 mm height and a 0.8 mm pixel pitch. The septa has a 90% specular reflectivity. These figures illustrate how the forward and reverse geometries affect the pulse-height spectra, and ensuing Swank factors differently. The Swank factor may be determined from the shape of the pulse-height spectrum and is a measure of the extra noise (beyond quantum noise) that is added to the received signal due to the response of an energy-integrating detector. The Swank factor may range from 0-1.0, with a value of 1 indicating no extra noise is added. A value of 0.5 means the DQE is reduced by half from what it would be if a perfect "photon-counting" detector were used. The Swank factor may be a function of the polychromaticity of the x-ray beam (beam spectrum) and of the scintillator response.

Figure 4C:
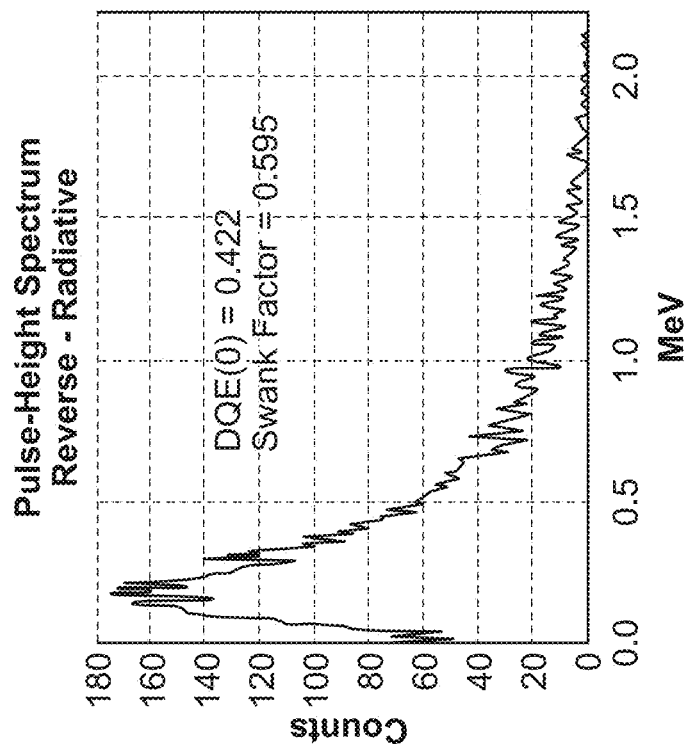
FIGS. 4B-4E show results from Monte Carlo simulations for radiative transport in the forward and reverse geometry as well the pulse height spectrum for the forward and reverse geometry.
Figure 4B:
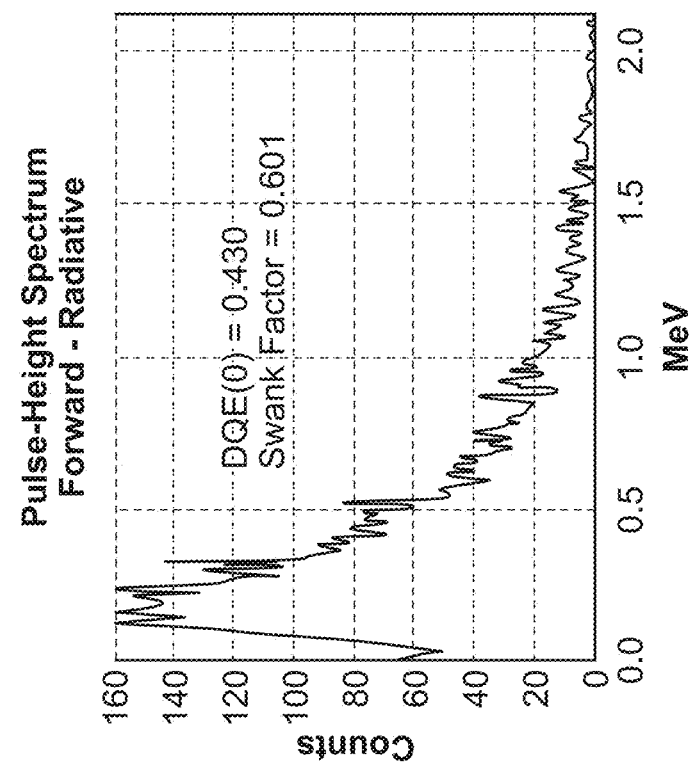
Figure 4D:
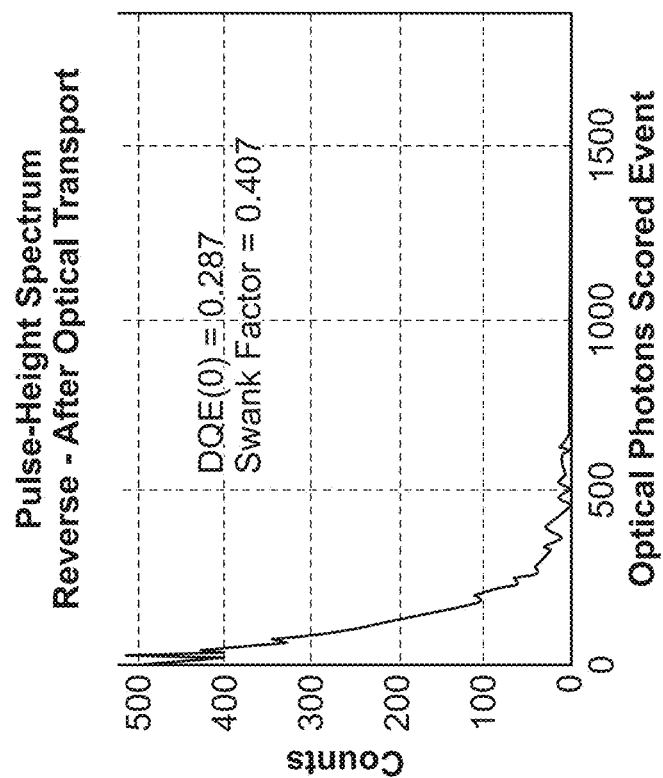

FIG. 4A shows the radiative pulse-height spectrum (PHS) produced in the forward geometry. Here only energy deposited in the scintillator is tallied and the PHS has a general shape similar to the beam spectrum (FIG. 3A). The radiative PHS shown in FIG. 4C is very similar to the PHS in FIG. 4B as would be expected since optical transport has not been considered. FIG. 4D shows the PHS that is produced by the received signal in the photodiode array after optical transport is considered. The PHS has narrowed considerably towards the left part of the plot and the resulting Swank factor has been reduced to 0.181. Using the reverse geometry the PHS has a more favorable shape and the Swank factor is increased up to 0.287, thereby significantly improving the DQE(0).

Figure 4E:
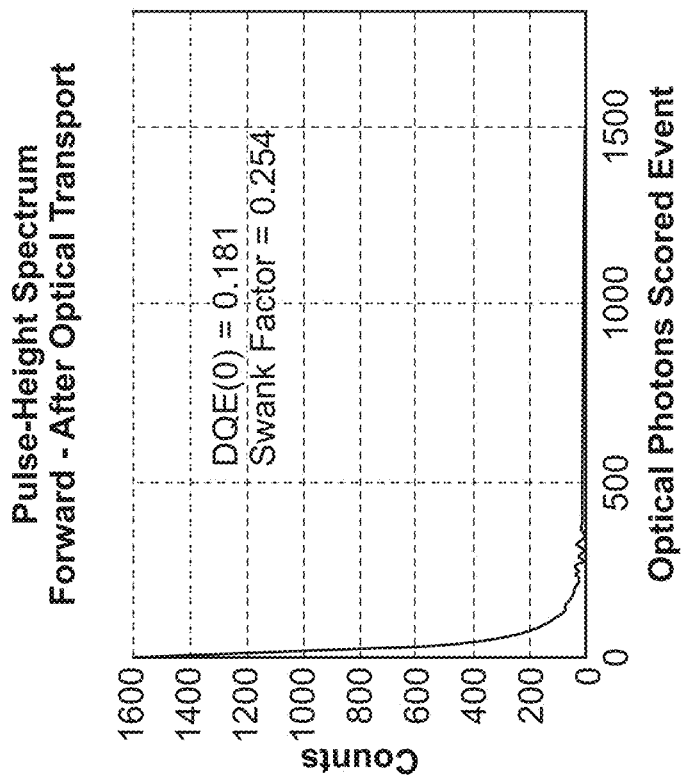

The Monte Carlo simulations shown in FIG. 4E demonstrate that the reverse geometry significantly reduces the sensitivity of the optical Swank factor (Iopt) to septa performance particularly for the 2.5 MeV spectrum. Notably, there is a maximum Iopt for a reflectivity of 95%, thus supporting the concept that the reverse geometry undoes some of the Swank effects inherent in the beam spectrum.

Figure 5:
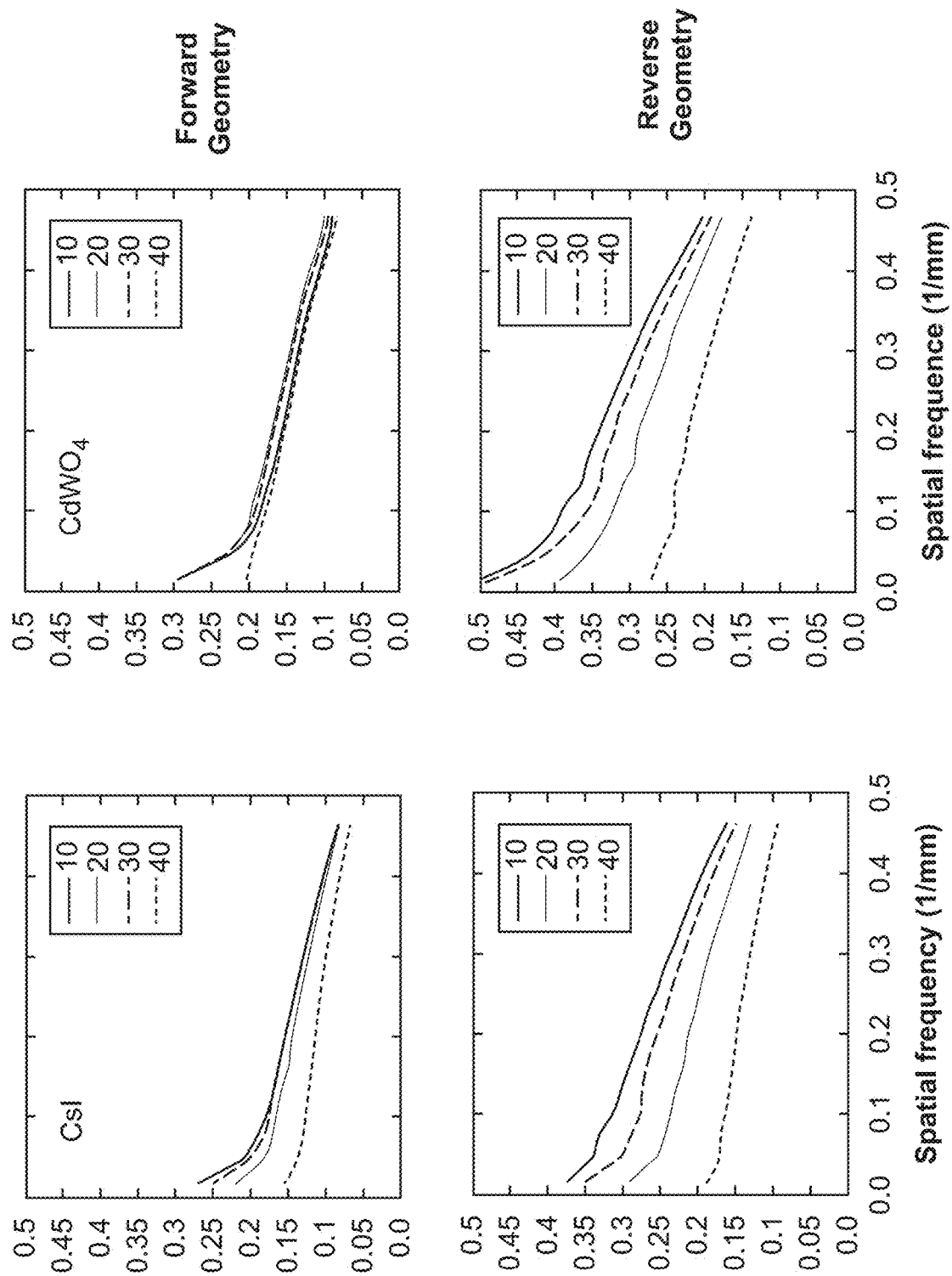
FIG. 5 illustrates improvement in optical Swank factor offered by reverse geometry for different crystal materials and different crystal thicknesses.

FIG. 5 shows the improvement in DQE(f) offered by the reverse geometry calculated using Monte Carlo simulations for both CdWO4 and CsI over a range of crystal thicknesses. It should be noted that the imaging device 200 is not limited by the examples of these materials, and that the imaging device 200 may include other scintillating materials in other embodiments.

Air Septa Separating Scintillator Elements

Figure 6A:
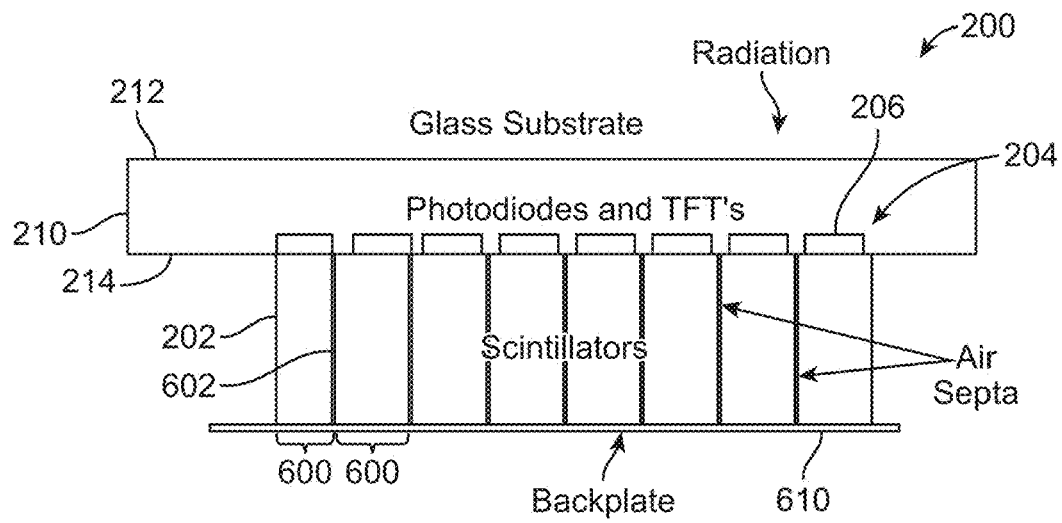
FIG. 6A illustrates an imaging device in accordance with some embodiments.

In one or more embodiments described herein, the manufacturing costs of the imaging device 200 may be significantly reduced if material septa (e.g., white plastic, metalize mylar, Vikuiti™) that are placed between scintillator elements are not required. FIG. 6A illustrates an embodiment of the imaging device 200, in which pixels 600 in the scintillator layer 202 are separated by air 602. The "air septa" 602 reduce optical crosstalk by internal reflection. The air septa 602 may be created using different techniques, such as by laser milling. In the embodiments of FIG. 6A, the air septa are milled through the entire thickness of the scintillator layer 202. The individual pixels 600 are attached to a plate 610. The plate 610 may be absorptive in some embodiments. In other embodiments, the plate 610 may be reflective. In further embodiments, the plate 610 may be both optically absorptive and reflective.

Figure 6B:
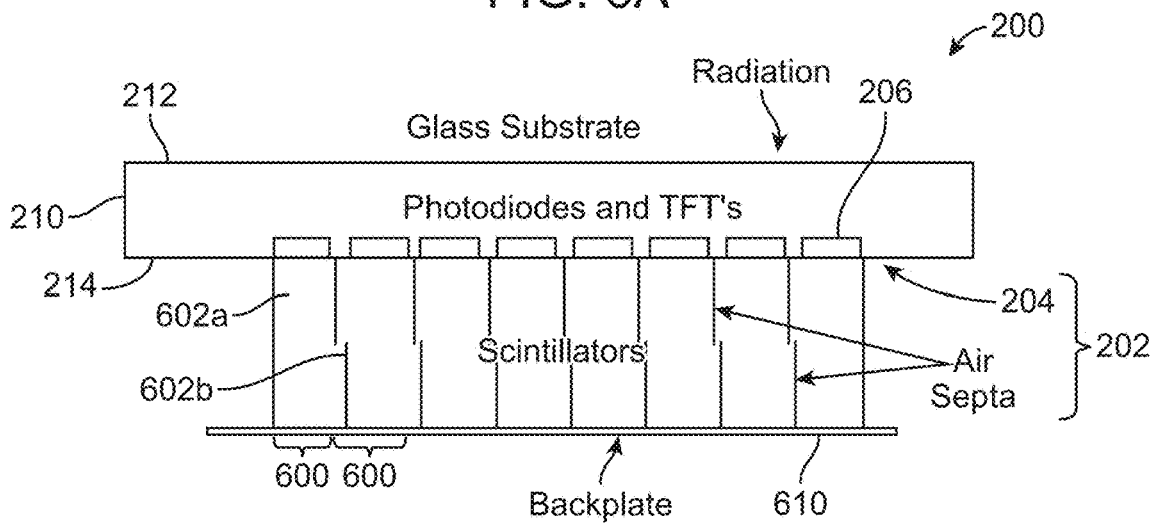
FIG. 6B illustrates an imaging device in accordance with some embodiments.

In other embodiments, as shown in FIG. 6B, the air gap 602 between two scintillator elements 600 may be achieved by milling from a top and milling from a bottom, thereby reducing the required aspect ratio of the milling beam. As shown in the figure, there may be a top air gap 602a achieved by milling from a top side of the scintillator layer 202, and a bottom air gap 602b achieved by milling from a bottom side of the scintillator layer 202. The air gaps 602a, 602b may not aligned like that shown in the figure, or may be aligned. The two air gaps 602a, 602b between two adjacent scintillator elements 600 may be offset like that shown in FIG. 6B, or they may align with each other to form a continuous gap like that shown in FIG. 6A.

Figure 6C:
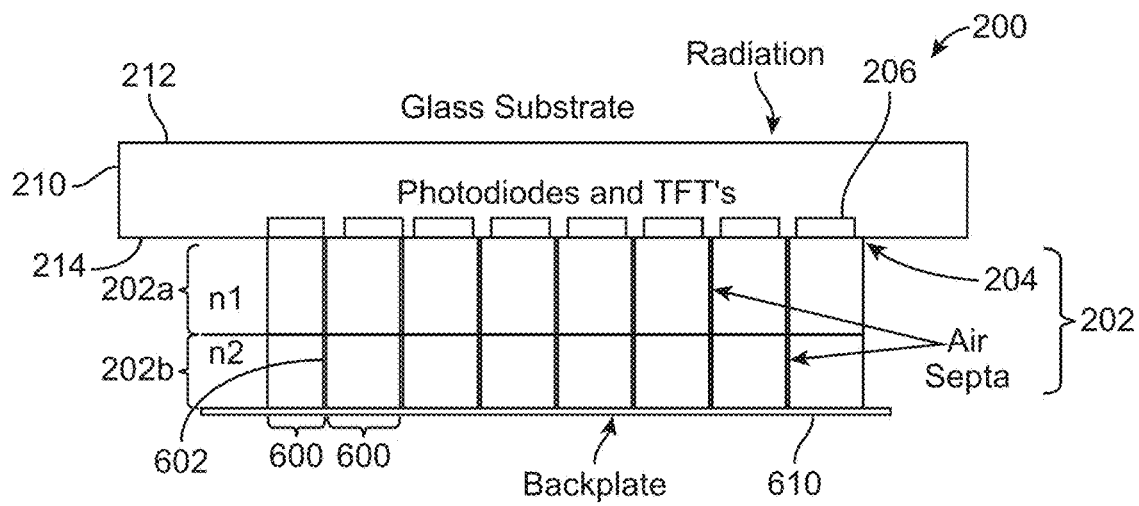
FIG. 6C illustrates an imaging device in accordance with some embodiments.

In further embodiments, the scintillator layer 202 may include two sub-scintillator layers 202a, 202b with different respective indices of refraction, which are combined to reduce optical blurring (FIG. 6C). If the index of refraction n2 for the second scintillator layer 202b is larger than index of refraction n1 for the first scintillator layer 202a, then internal reflection will cause some off-angle rays that are produced in the scintillator layer 202b to be reflected at the boundary of the layers 202a, 202b to then be absorbed by the plate 610.

Figure 7:
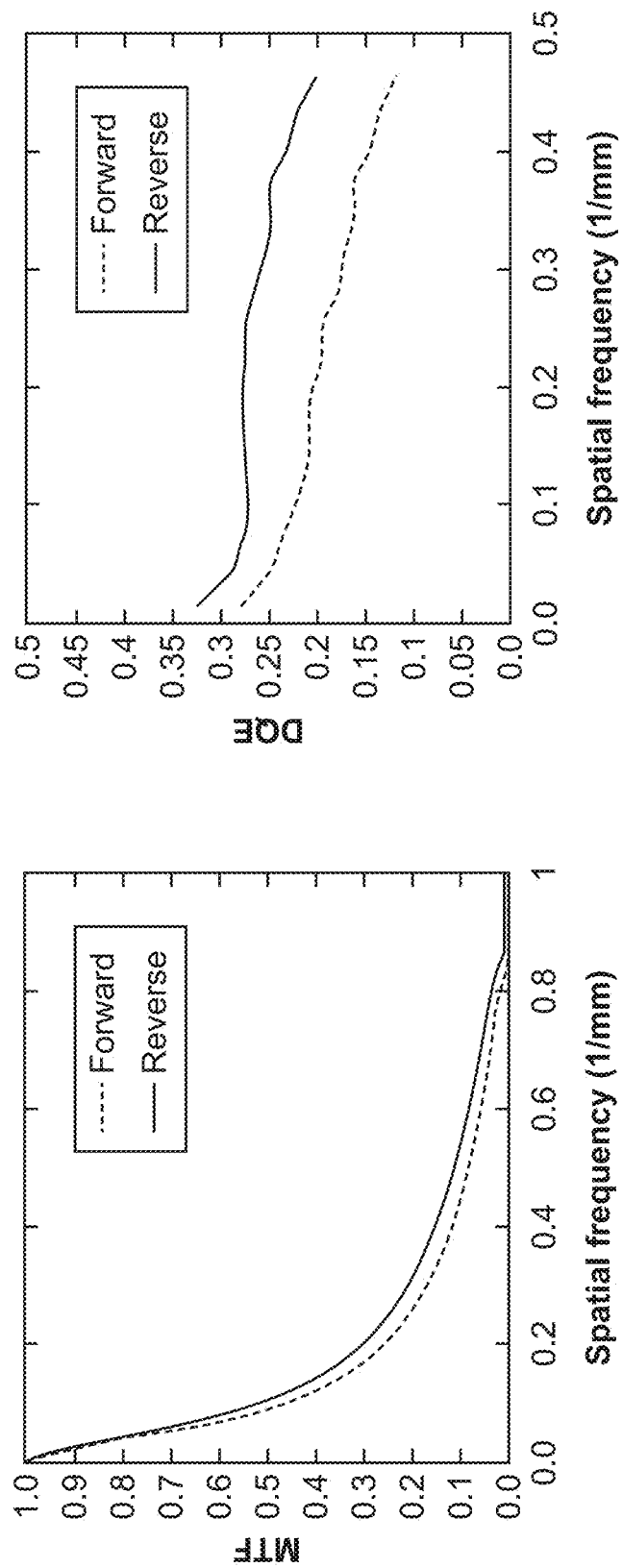
FIG. 7 illustrates MTF and DQE as a function of spatial frequency, demonstrating an improvement in DQE for the reverse geometry.

FIG. 7 shows Monte Carlo simulation results for the imaging device 200 of FIG. 6A that has air septa (with width=0.15 mm) separating scintillator pixels 600. The simulation was performed assuming the imaging device 200 has a 10 mm think CdWO4, the source producing a 2.5 MeV beam, and pixel pitch of the imaging device 200 being 1.176 mm. The simulation results indicate that the reverse geometry is preferred over the forward geometry, and that air septa produce satisfactory spatial resolution.

It should be noted that although the embodiments of the imaging device 200 of FIGS. 6A-6C are illustrated as having the photodiode elements 206 being located closer to the second side 214 of the glass substrate 210 than the first side 212, in other embodiments, the imaging devices 200 of FIGS. 6A-6C may have the photodiode elements 206 being located closer to the first side 212 than the second side 214, like that shown in the embodiments of FIG. 2B. Also, in other embodiments, the imaging devices 200 of FIGS. 6A-6C may have a layer of focusing elements 220, like that shown in the embodiments of FIG. 2C. In further embodiments, the imaging devices 200 of FIGS. 6A-6C may have an additional scintillator layer, like the scintillator layer 230 shown in the embodiments of FIG. 2D. Also, in other embodiments, the imaging devices 200 shown in FIGS. 2A-2D may have air septa between scintillator elements in the scintillator layer 202, like the air septa configuration shown in any of FIGS. 6A-6C.

Also, in other embodiments, the air septa configuration shown in the embodiments of FIGS. 6A-6C may be implemented in an imaging device that has a forward geometry, instead of the reverse geometry shown.

Parallax Reduction

Figure 8A:
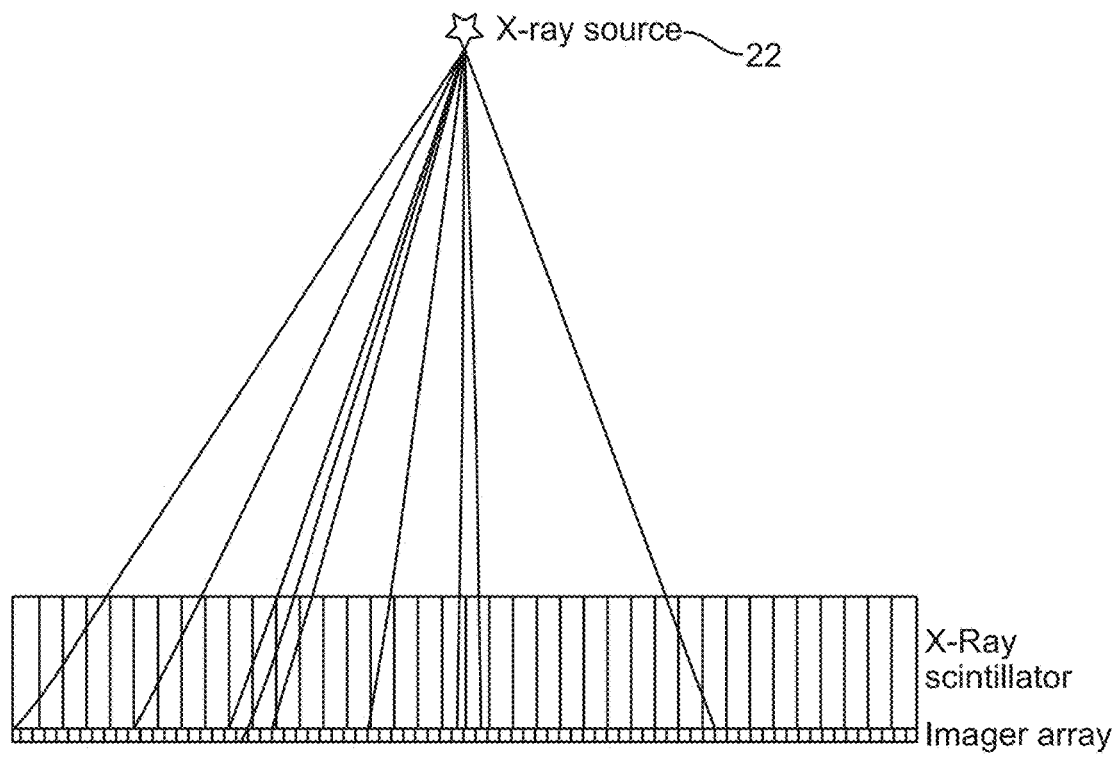
FIG. 8A illustrates how spatial resolution of an imager is affected by parallax.
Figure 8B:
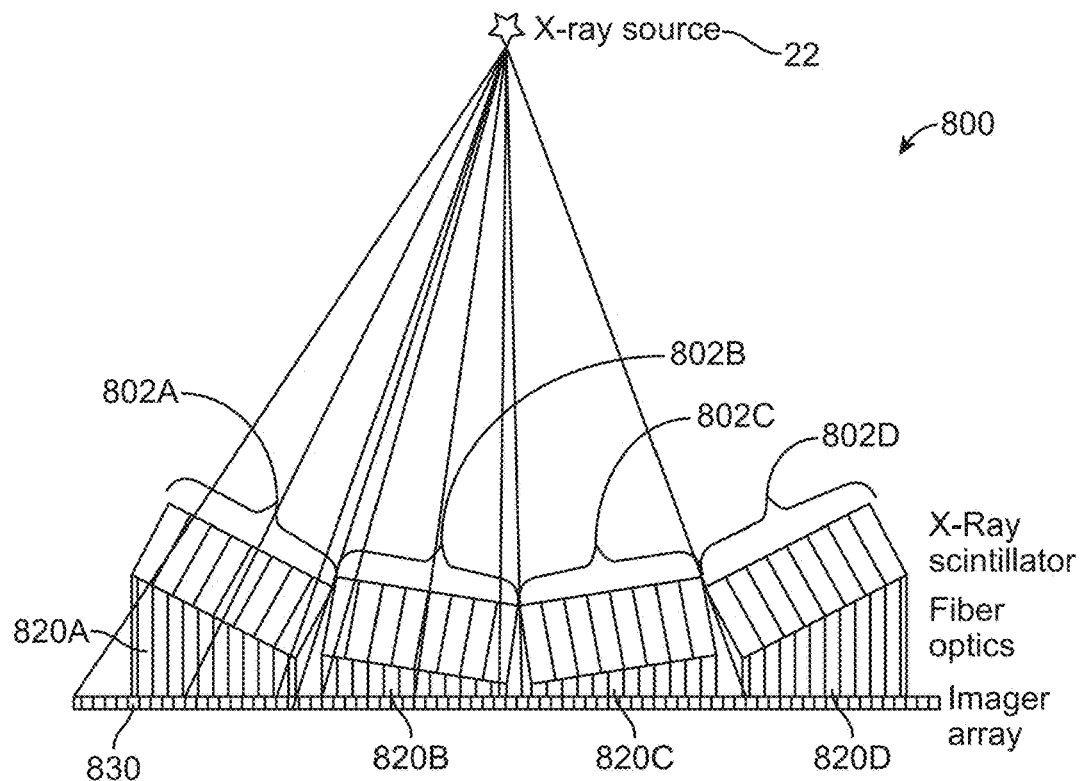
FIG. 8B illustrates an imaging device that reduces an effect of parallax.

In some cases, as the scintillator thickness increases, the central x-ray of the cone-beam may pass through just one pixel while the peripheral x-rays may pass through multiple pixels. As a result, the resolution of the imaging device may be degraded the farther the rays are from the central beam. This concept is illustrated in FIG. 8A. To address this problem, the imaging device may have multiple blocks of scintillator layers that are tilted to face towards the radiation source 22. For example, as shown in FIG. 8B, the imaging device 800 may have multiple scintillator layers 802a-802d, each of which having a plurality of scintillator elements 810. Adjacent scintillator layers (e.g., 802a and 802b) are arranged in respective planes (e.g., first plane and second plane). The adjacent scintillator layers (e.g., 802a and 802b) are arranged next to each other and form a non-zero angle relative to each other. In some embodiments, each of the scintillator layers 802 is oriented so that a normal that is perpendicular to the plane of the scintillator layer 802 points towards the radiation source 22. As shown in the figure, the imaging device 800 further includes fiber optic arrays 820a-820d for the respective scintillator layers 802a-802d. Each fiber optic array 820 includes multiple fiber optics that are configured to couple lights from the scintillator elements 810 to the imager array (photodiode elements) 830. In the illustrated embodiments, the imager array 830 is arranged on a flat (i.e., rectilinear) plane, and the fiber optics in the fiber optic arrays 820a-820d extend perpendicular out of the plane of the imager array 830 to reach the scintillator layers 802a-802d. Since the scintillator layers 802a-802d are oriented at different angles, the fiber optics have different lengths. In other embodiments, the imager array may be curved or may have multiple angles that correspond with the boundaries of the adjacent scintillator arrays 802. In some embodiments, each fiber optic will transmit light to the imager array 830 with no loss of spatial registration as the fiber pitch is small with respect to both the scintillator pixel pitch as well as the imager array 830.

Figure 8C:
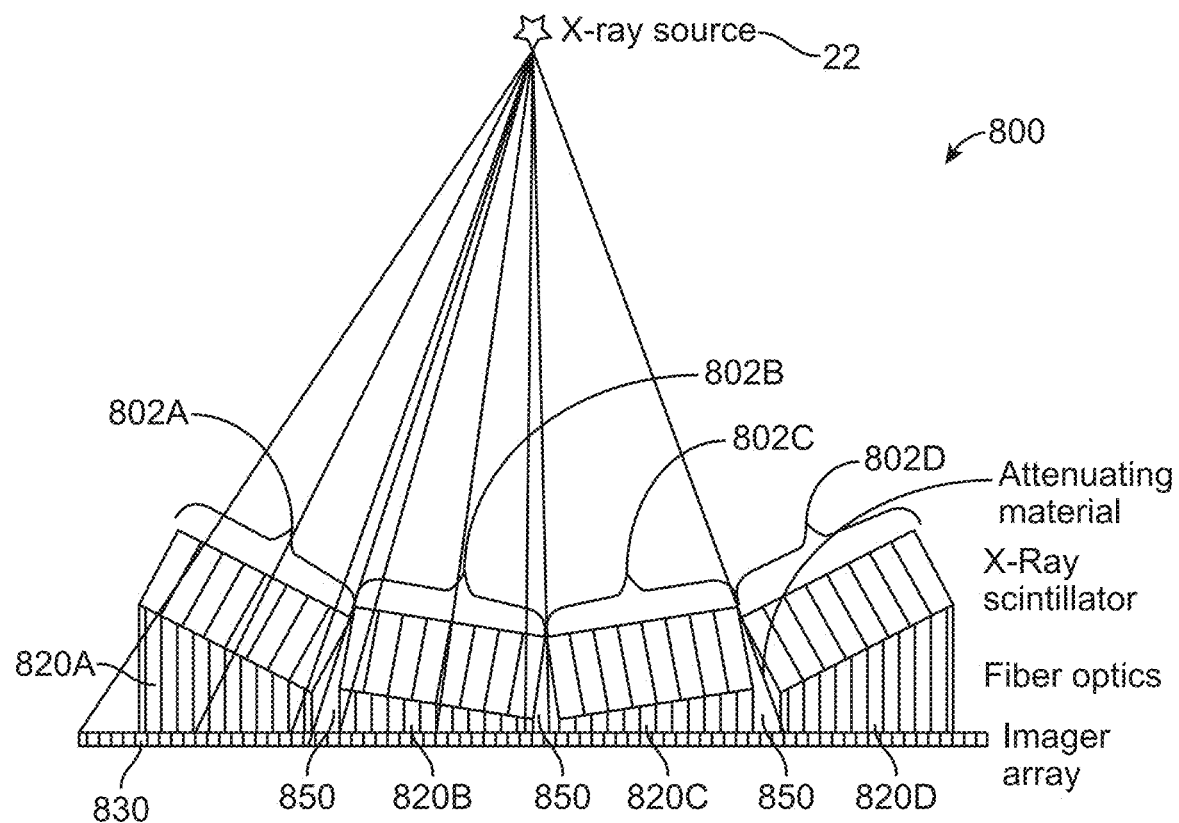
FIG. 8C illustrates an imaging device in accordance with some embodiments that reduces the effect of parallax.

In the embodiments of FIG. 8B, gaps between the scintillator layers 802 will occur since the blocks of scintillator layers 802 are tilted with respect to each other. This area will be sensitive to the x-rays hitting the edge scintillator pixels. This problem may be reduced if the gap area is filled with a material 850 with similar attenuating properties as the pixilated scintillator material, like that shown in FIG. 8C. The attenuating material 850 may extend below the scintillator layers 802, and may for example, reach the imager array 830. In other embodiments, the attenuating material 850 may not extend below the scintillator layers 802.

Figure 8D:
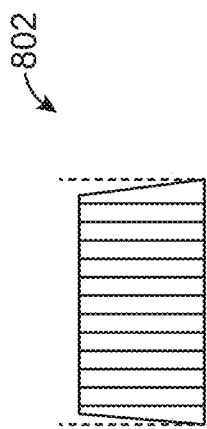
FIG. 8D illustrates a scintillator array having beveled sides.
Figure 8E:
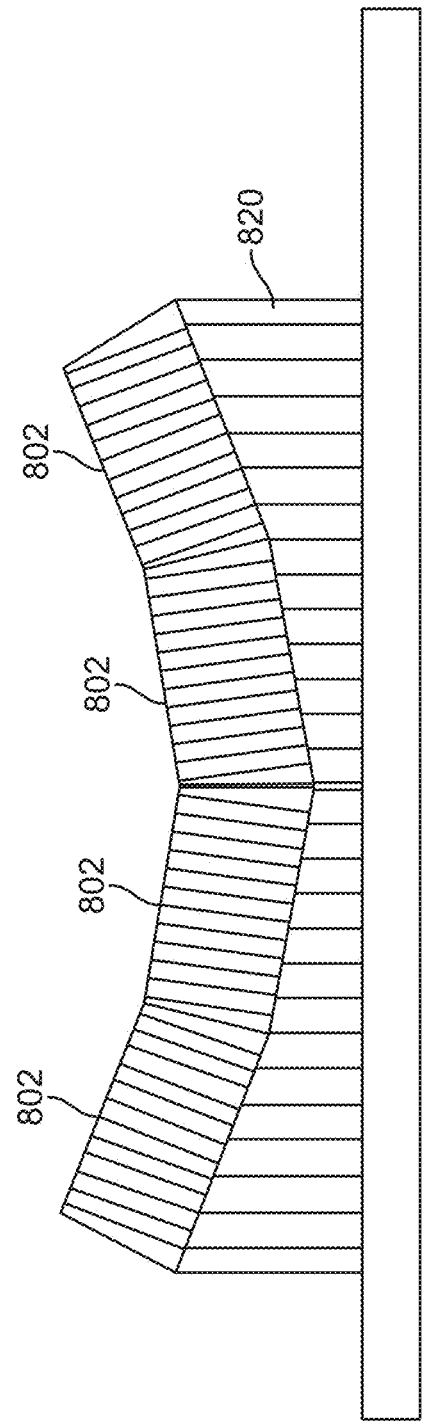
FIG. 8E illustrates multiple scintillator arrays with beveled sides, particularly showing the scintillator arrays aligned with each other and coupled to the fiber optic plates.

Another method of reducing the gaps is to bevel the sides of the scintillator arrays 802 as illustrated in FIG. 8D. As shown in FIG. 8E, the arrays will be well aligned to each other with minimum gaps once coupled to the fiber optic plates 820. The beveling may be implemented on all four sides in some embodiments.

Figure 8F:
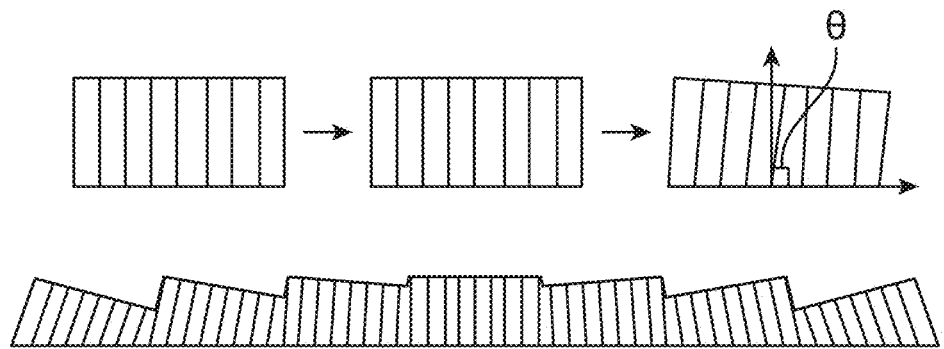
FIG. 8F illustrates another imaging device that reduces the effect of parallax.

FIG. 8F shows another imaging device that has the capability of reducing the effect of parallax. As shown in the imaging device has multiple blocks of scintillators arranged in a side-by-side configuration. The center block of scintillator forms a perpendicular angle with respect to a plane of the imaging device. For the blocks directly next to the center block, the scintillators form a non-90° angle with respect to the plane of the imaging device. As the blocks are further away from the center block, the angle formed by the respective scintillators relative to the imaging device. Such configuration is advantageous in that the blocks of the scintillator form a rectilinear flat plane at the bottom (which allows the blocks to be coupled to a plane of another component of the imaging device), while allowing the scintillator angles (e.g., orientation of the scintillators) to be progressively increased as the scintillators are further away from the center of the imaging device. In the illustrated embodiments, the scintillators in each block are oriented in the same angle. In other embodiments, the scintillators in each block may be oriented at different respective angles (e.g., with the scintillator further away from the center of the imaging device forming a higher angle relative to the plane of the imaging device). For example, the scintillator in the middle may form 90° relative to the plane of the imaging device, and the scintillator next to it may form 92° relative to the plane of the imaging device, etc. In further embodiments, instead of having blocks of scintillators, the imaging device may have multiple scintillators that are formed or coupled together without them being in "block" configuration.

Figure 8G:
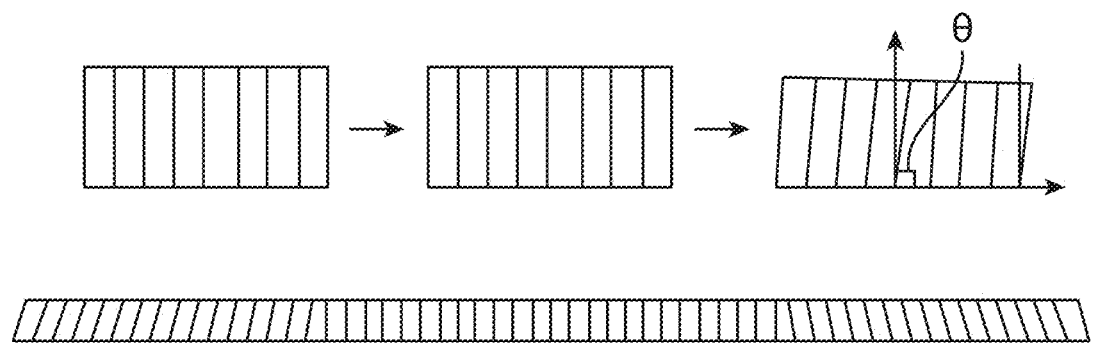
FIG. 8G illustrates another imaging device that reduces the effect of parallax.

FIG. 8G shows another imaging device that has the capability of reducing the effect of parallax. The imaging device is similar to that shown in FIG. 8F, except that the top of the scintillators also form a rectilinear flat surface. As shown in FIG. 8G, the imaging device has multiple blocks of scintillators arranged in a side-by-side configuration. The center block of scintillator forms a perpendicular angle with respect to a plane of the imaging device. For the blocks directly next to the center block, the scintillators form a non-90° angle with respect to the plane of the imaging device. As the blocks are further away from the center block, the angle formed by the respective scintillators relative to the imaging device. Such configuration is advantageous in that the blocks of the scintillator form a rectilinear flat plane at the bottom (which allows the blocks to be coupled to a plane of another component of the imaging device), while allowing the scintillator angles (e.g., orientation of the scintillators) to be progressively increased as the scintillators are further away from the center of the imaging device. In the illustrated embodiments, the scintillators in each block are oriented in the same angle. In other embodiments, the scintillators in each block may be oriented at different respective angles (e.g., with the scintillator further away from the center of the imaging device forming a higher angle relative to the plane of the imaging device). For example, the scintillator in the middle may form 90° relative to the plane of the imaging device, and the scintillator next to it may form 92° relative to the plane of the imaging device, etc. In further embodiments, instead of having blocks of scintillators, the imaging device may have multiple scintillators that are formed or coupled together without them being in "block" configuration.

In the illustrated embodiments, the scintillator layers 802a-802d are configured to receive radiation before the array of photodiode elements 830, as in a forward geometry. In other embodiments, the scintillator layers may be configured to receive radiation that has passed through the array of photodiode elements 830, as in a reverse geometry like that shown in the embodiments of FIGS. 2A-2D, and 6A-6C. For example, in other embodiments, the scintillator layer 202 shown in FIGS. 2A-2D and 6A-6C may be implemented using a plurality of blocks of scintillator layers (like those shown in the embodiments of FIGS. 8B, 8C, and 8E). The scintillator layers may be tilted so that they all face towards the radiation source 22. The scintillator layers in the imaging device 200 may be coupled optically to the photodiode elements 206 using fiber optics.

Septa-Less Detector and Optical Grid

Figure 9:
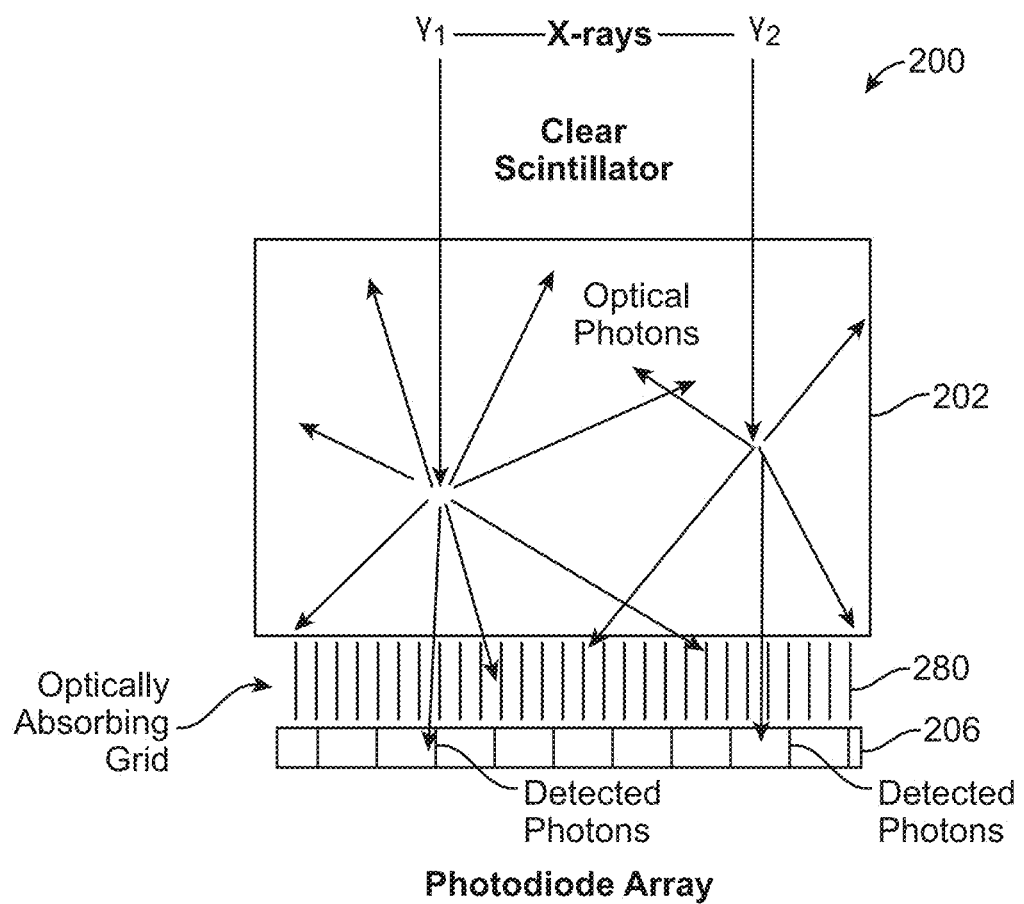
FIG. 9 illustrates an imaging device having a non-pixelated scintillator layer and an optical grid.

In one or more embodiments described herein, the scintillator layer of the imaging device may be non-pixelated. In such cases, the imaging device may further include an optical grid. FIG. 9 illustrates an imaging device 200 having a scintillator layer 202, an array of photodiode elements 206, and an optical grid 280 disposed between the scintillator layer 202 and the array of photodiode elements 206. In the illustrated embodiments, the scintillator layer 202 is non-pixelated, so that the scintillator material extends continuously across a plane of the imaging device 200. The sidewalls of the optical grid 280 may be opaque and may be non-reflective, so that the only photons to reach the photodiode array are those whose direction vectors are nominally normal to the scintillator-photodiode boundary. Such configuration allows spatial resolution (MTF) to be preserved and optically blurring to be minimized, or at least reduced. In some cases, the spatial resolution of an imager may be indicated/represented by the modulation transfer function (MTF), which is the absolute value of the Fourier transform of the Point Spread Function (PSF). The optical grid 280 may be completely absorbing, or may be partially reflective of photons at steep angles to channel those to the photodiode plate. The optical grid 280 may be constructed from any number of materials, including but not limited to, fiber optic plates, capillary plates, etched silicon wafers, etched plastic and metal grids.

In the illustrated embodiments, the optical grid 280 is a two-dimensional grid. In other embodiments, the array may be made from slabs with reflecting walls and the optical grid may be one-dimensional. In one implementation, the optical grid may be accomplished by stacked plates. The reflecting septa (e.g., the wall(s) between the scintillator elements) may be composed of metalized (e.g., aluminized) mylar or other polymer to increase the fill factor. The reflecting septa may be any material that has an optically reflective property.

Also, in some embodiments, a plate (like the plate 610 in FIG. 6A-6C) may be provided. The plate may be optically absorptive, optically reflective, or both. For example, in some embodiments, the plate may be composed of a retro-reflector to increase the detected signal.

Figure 10:
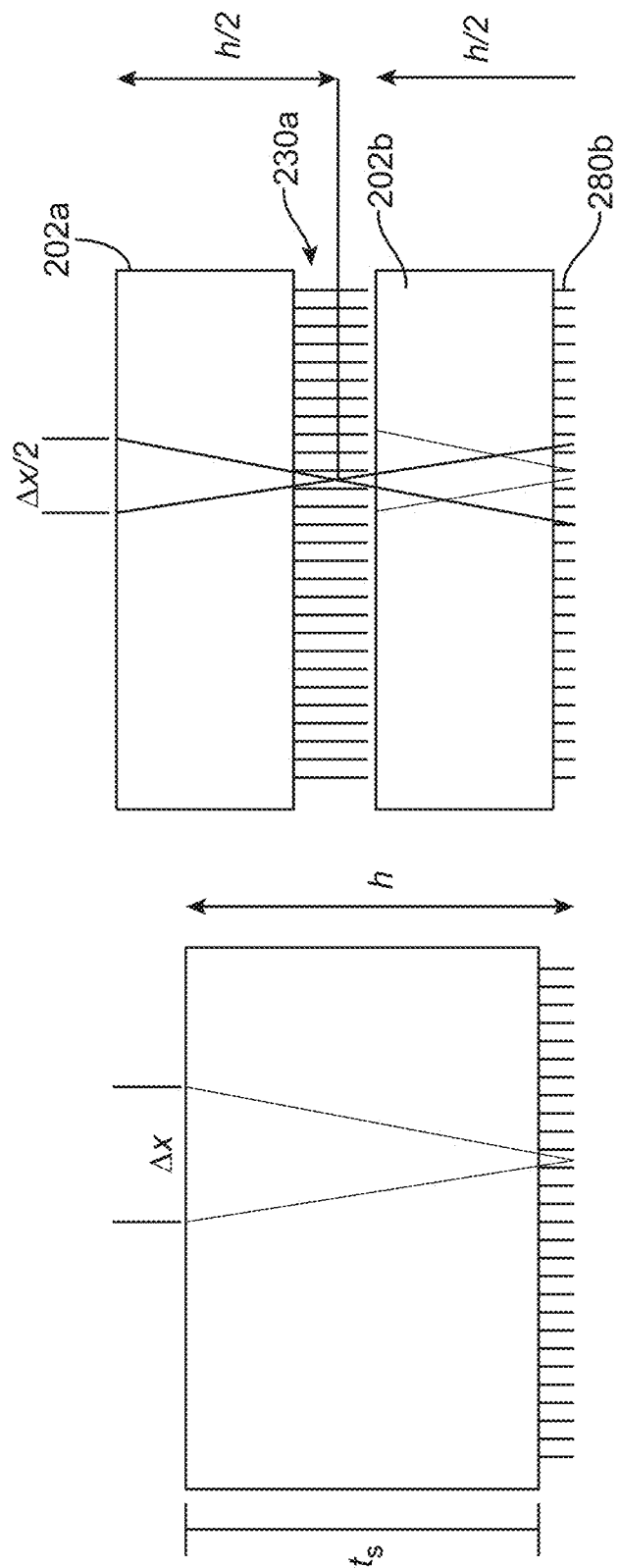
FIG. 10 illustrates an imaging device having two non-pixelated scintillator layers and two optical grids.

Also, in some embodiments, the scintillator layer 202 may be implemented using multiple sub-scintillator layers 202a, 202b that are stacked together with respective optical grids 280a, 280b, like that shown in FIG. 10. Such configuration allows the optical grid pitch to be decreased to increase the detected signal.

It should be noted that the optical grid described herein is not limited to being used with an imaging device with non-pixelated scintillator layer, and that the optical grid may also be used with imaging devices with pixelated scintillator layer(s), such as the imaging devices 200 described with reference to FIGS. 2A-2D and 6A-6C.

Use of the optical grid 280 may cause a significant reduction in the total number of optical photons that are detected. Thus, the imaging process may become susceptible to panel-related electronic noise sources which, in turn, may reduce DQE(f). In some cases (e.g. MV portal imaging) the number of optical photons that are generated may be sufficiently high to still permit the use of the optical grid 280 with conventional amorphous silicon flat panel technology. In other cases, the electronic noise floor of the imager may need to be reduced using such semiconductor technologies such as CMOS or GZO for the readout arrays. In the following sections, an analysis of electronic noise and design configurations are discussed that permit the detection of more optical photons yet still reduce the manufacturing costs of the array. In particular, in the following sections, design considerations for the optical grid, including (A) spatial resolution and optical grid parameters and (B) optical photon fluence, are discussed.

A. Spatial Resolution and Optical Grid Parameters

The following discussion assumes that the optical grid is rectilinear and that the resulting optically-induced point-spread function (PSF) is separable in x and y. For convenience, a square grid such that PSF(x)=PSF(y), is assumed. However, it should be noted that the optical grid is not limited to having a rectilinear configuration, and may have other configurations (e.g., a curvilinear configuration, a step configuration, etc.) in other embodiments.

Figure 11:
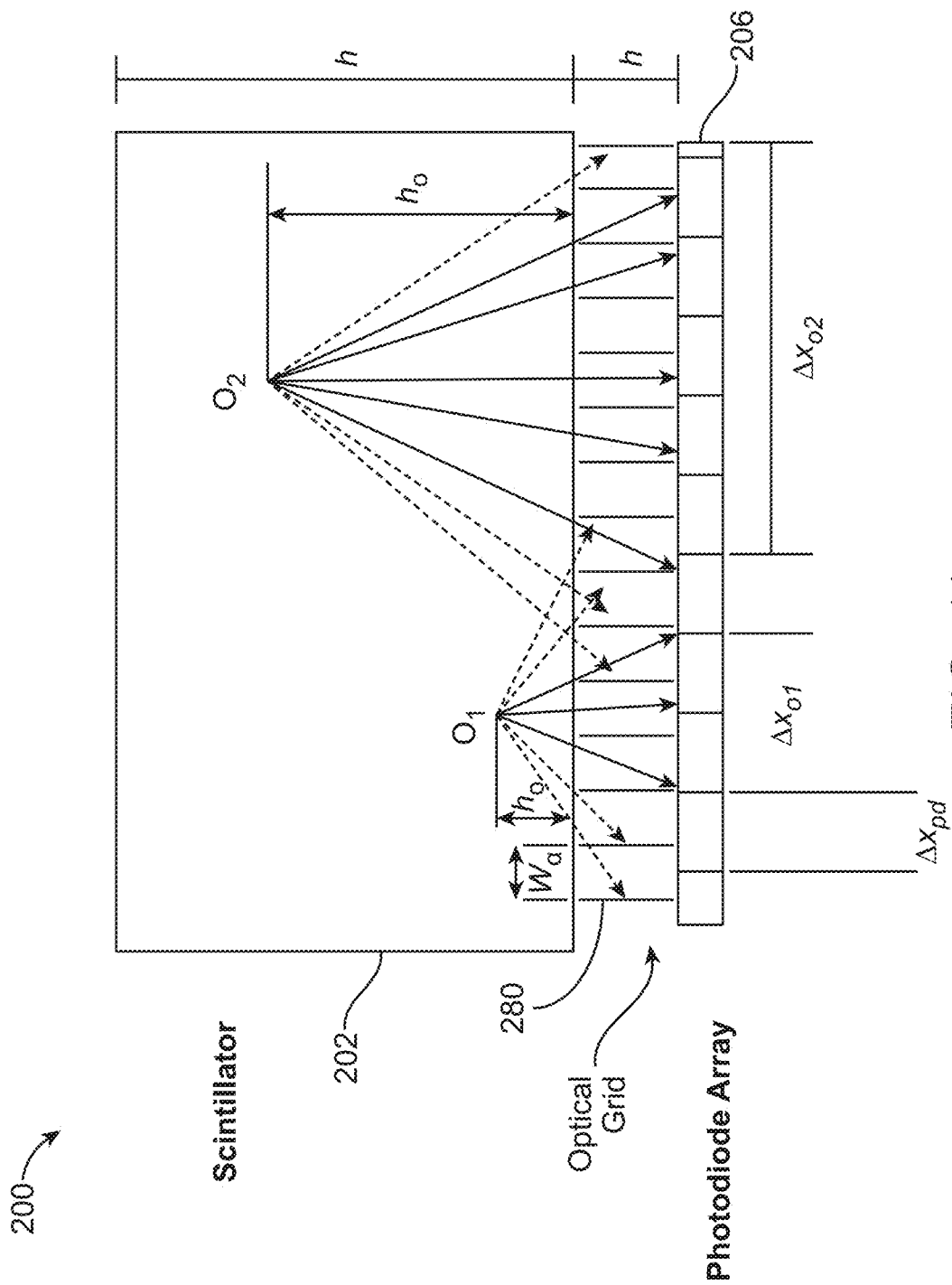
FIG. 11 illustrates the nature of optical blurring mechanism for two cases.

The aspect ratio of the grid $\alpha$ primarily determines the spatial resolution of the proposed detector. $\alpha$ is defined as the grid height $h_g$ divided by the grid width $w_g$: $\alpha = h_g/w_g$ FIG. 11 illustrates the nature of the optical blurring mechanism for two cases. As shown, input gamma photons $\gamma_1$ and $\gamma_2$ interact at positions $O_1$ and $O_2$ which are at different depths relative to the bottom of the scintillator (i.e. the side in contact with the optical grid).

Assuming perfectly opaque and non-reflective grid walls, the detected optical photons that originate at a point $O_1$ are spread by an amount $\Delta x_{o1}$ at the photodiode plane:

$$\Delta x_{o1} = 2(h_{o1} + h_g)/\alpha$$

where $h_{o1}$ is the height of the optical point source relative to the bottom of the scintillator 202; $h_g$ is the grid height, and $\Delta x_{pd}$ is the photodiode pixel pitch.

Similarly, for the second source $$\Delta x_{o2} = 2(h_{o2} + h_g)/\alpha$$

As is evident, blurring is inversely proportional to the grid's aspect ratio, and is more significant the further the optical source is removed from the grid 280.

The model shown above is overly simplified since, in actuality, optical spreading is not uniform across the widths $\Delta x_{o1}$ and $\Delta x_{o2}$. As shown in FIG. 12, for a point source, grid shadowing leads to a triangular distribution of detected photons t(x) that takes the form:

$$t(x) = 1 - \alpha|x|/h, \text{ for } |x| <= h/\alpha,$$
$$= 0 \quad \text{for } |x| > 0.$$

Figure 14:
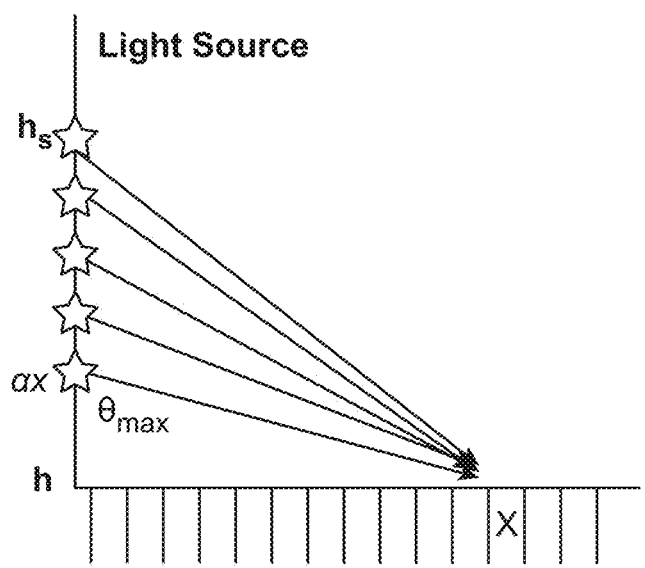
FIG. 14 shows light sources contributing to a signal.

In addition to the triangular distribution resulting from grid wall shadowing, the intensity of light also falls off as the distance from the source increases due to the geometrical effects of projecting the beam onto the x-axis (FIG. 14). This relationship can be determined by evaluating the density of rays crossing the x-axis as a function of h and x, as is best understood when mapped to cylindrical coordinates(r, $\theta$).

As shown in FIG. 13, photons traversing the line $dl=rd\theta$ traverse a greater length $dx=dl/\cos(\theta)$ along the x-axis to reach the photodiode array. Hence, signal intensity drops off as $\cos(\theta)/r$.

Multiplying the triangular blurring mechanism t(x) by the $\cos(\theta)/r$ intensity blurs the optical PSF ($p_s$) resulting from a single source at height (0,h) is $$p_s(x, h) = \frac{(1 - \alpha|x|/h)\cos(\theta)}{r}, \forall |x| \le h/\alpha \quad \text{Eq. 1}$$

Using the relations, $$r = \sqrt{x^2 + h^2} \text{ and } \cos(\theta) = \frac{x}{\sqrt{x^2 + h^2}},$$

Equation 1 can be rewritten as $$p_s(x, h) = \frac{(1 - \alpha|x|/h)x}{x^2 + r^2}, \forall |x| \le h/\alpha \quad \text{Eq. 2}$$

Equation 2 gives the individual point-spread function ($p_s$) resulting from a single source at position h. The total PSF for a slab (FIG. 14) is then determined by integrating Eq. 2 starting at position $h=\alpha x$ to $h=h_s$, where $h_s$ is the top of the scintillator relative to the position of the optical grid 280. The starting point may be at position $h=\alpha x$, which is the minimum height that produces a detectable (unshadowed) optical ray at position x for a given grid aspect ratio.

The total PSF is thus given by:

$$PSF(x) = \int_{\alpha x}^{h_s} \left( \frac{A(h)(1 - \alpha|x|/h)h}{x^2 + h^2} \right) dh \quad \text{Eq. 3}$$

where A(h) represents the source intensity at position h.

For illustrative purposes, it is assumed that the deposited energy from gamma photons is uniformly distributed along h (i.e. A(h)=1). This is not completely unreasonable for high energy (MV) x-rays given their significant penetration depth. It is further assumed that there is no reflection from the top of the scintillator The solution to above integral (Eq. 3) with A(h)=1 will heretofore be referred to as $PSF_{opt1}$.

$$PSF_{opt1}(x) = \qquad \text{Eq. 4}$$
$$\alpha\tan^{-1}(|x|/hs) + \frac{1}{2}\ln(x^2 + hs^2) - \alpha\tan^{-1}(1/\alpha) - \frac{1}{2}\ln(x^2(1+\alpha^2))$$

The MTF is the absolute value of the Fourier transform of the PSF, which is may be easily evaluated numerically.

$PSF_{opt1}$ can be further simplified since, in all practical cases, $\alpha>1$, and consequently $h^2 >> x^2$ allowing one to approximate each individual point-spread function as follows:

$$p_s(x) \cong \frac{(1-\alpha|x|/h)}{h} \qquad \text{Eq. 5}$$

which results in a total PSF given by:

$$PSF_{opt2}(x) = \int_{\alpha x}^{h_s} \left( \frac{A(h)(1-\alpha|x|/h)}{h} \right) dh \qquad \text{Eq. 6}$$

For the case of A(h)=1, the integral of Eq. 6 yields $PSF_{opt2}$.

$$PSF_{opt2}(x) = \frac{\alpha|x|}{h_s} + \ln(h_s) - 1 - \ln(\alpha|x|) \qquad \text{Eq. 7}$$

Alternatively, the MTF can be approximated directly by assuming a simple triangular distribution in the spatial domain without the $\cos(\theta)/r$ weighting. One may integrate the Fourier transform ($\text{sinc}^2$) of the triangular distribution over the scintillator depth.

$$MTF_{sinc2}(f) = \int_0^{hs} \frac{\sin^2\left(\frac{\pi h f}{2\alpha}\right)}{\left(\frac{\pi h f}{2\alpha}\right)^2} dh \qquad \text{Eq. 8}$$

This integral also can be analytically solved:

$$MTF_{sinc2}(f) = \frac{\frac{\pi h f}{\alpha}\text{SinInt}\left(\frac{\pi h_s f}{2\alpha}\right) + \cos\left(\frac{\pi h f}{2\alpha}\right) - 1}{2\left(\frac{\pi h_s}{2\alpha}\right)^2 f} \qquad \text{Eq. 9}$$

In the spatial domain, there are now two analytical means of calculating the PSF ($PSF_{opt1}$, $PSF_{opt2}$) and, in the frequency domain, one means of calculating MTF analytically ($MTF_{sin\ c2}$). Finally, the blurring effects of the finite grid spacing $w_g$ may also be accounted for. This blurring can be modeled as a convolution of the optical PSF with a RECT function characterizing the grid spacing.

$$PSF_{grid}(x) = PSF_{opt}(x) x \Pi(x/w_g) \qquad \text{Eq. 10}$$

Alternatively, via the Fourier convolution theorem, the optical MTF may be multiplied by a sin c function whose form is similarly dependent on the grid spacing.

$$MTF_{grid}(f) = MTF_{opt}(f) \cdot \text{sin } c(w_g f) \qquad \text{Eq. 11}$$

Equations 4,7 and 9 were evaluated for the case of a scintillator thickness of 10 mm ($h_s$=10), an aspect ratio $\alpha$=8, a grid spacing $w_g$=0.2 mm, and a lamella width $w_l$=0.02 mm (note $w_l$ does not affect the PSF/MTF shape, but does affect the fill factor of the grid, and hence the number of optical photons that are detected as shown below). The results of Equations 4 and 7 were convolved with a RECT function (Eq. 10) to account for the finite grid spacing $w_g$, and the result of Equation 9 was multiplied by a sin c function (Eq 11) to account for the finite grid width.

Figure 15:
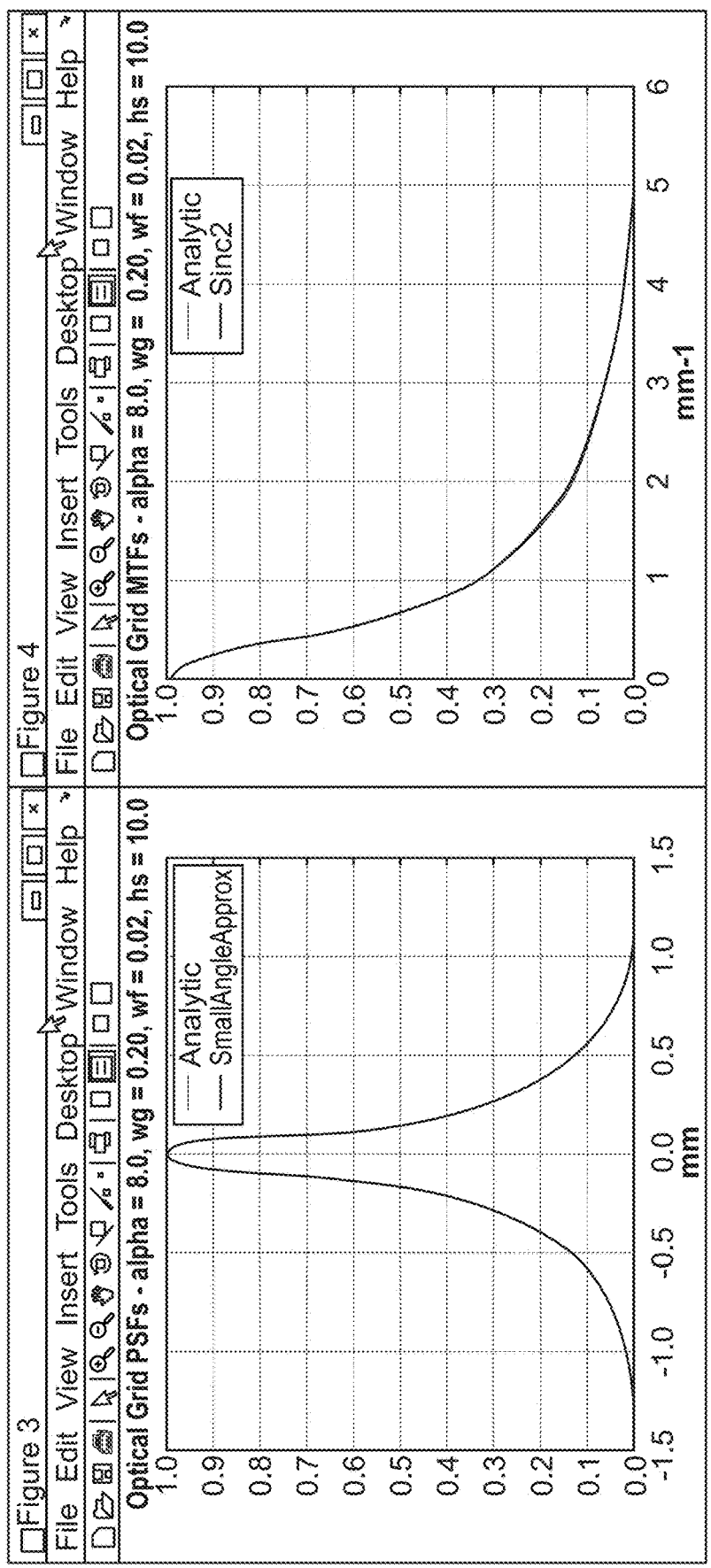
FIG. 15 shows point-spread functions for various parameters, and Fourier transform of PSF plotted along with the MTF.

As shown in FIG. 15, $PSF_{opt2}$ matches $PSF_{opt1}$ for the conditions modeled. The equivalence shows that the small angle approximation is valid, and that the integral for $PSF_{opt2}$ (Eq. 6), which offers more flexibility when A(h) does not equal 1 (for example, A(h) is an exponential function), is preferred. Calculation of the MTF directly using Eq. 9 also yields a quite accurate result A(h)=1.

The accuracy of the analytical grid models was evaluated via comparisons with Monte Carlo simulations using the following parameters: scintillator=CsI, height=10 mm, grid aspect ratio=9, grid spacing=0.2 mm, and photodiode pixel size=0.392 mm.

To generate the total MTF with the analytical model, a Monte Carlo simulation may first be performed using just radiative (no optical) transport to generate the $MTF_{radiative}$, which is multiplied by the analytical grid model $MTF_{grid}$ multiplied by the MTF associated with the EPID pixel size $MTF_{pixel}$. $MTF_{pixel}$ is simply a sin c function.

$$MTF_{Tot}(f) = MTF_{radiative} \cdot MTF_{grid} \cdot MTF_{pixel}$$

Figure 16:
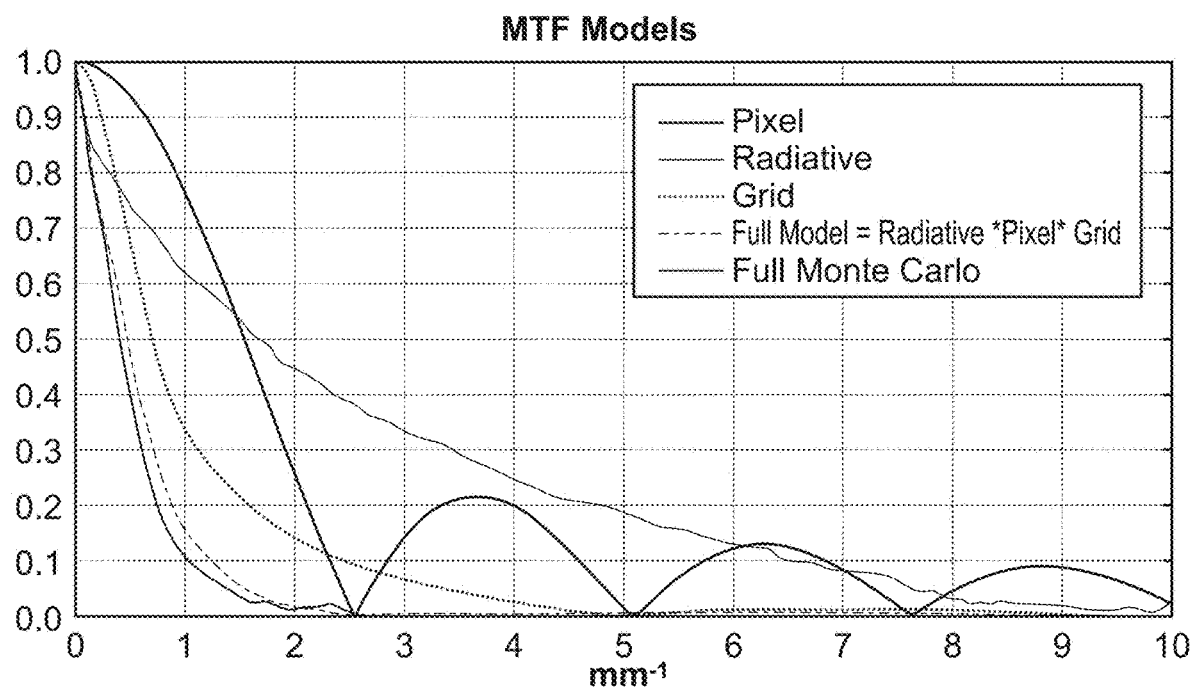
FIG. 16 shows agreement between full Monte Carlo simulation and the combined radiative transport simulation plus optical model.

$MTF_{tot}$ was compared with a full Monte Carlo simulation, which included both radiative and optical transport As shown in FIG. 16, good agreement is obtained between the Full Monte Carlo simulation and the combined radiative transport simulation plus optical model.

Figure 17:
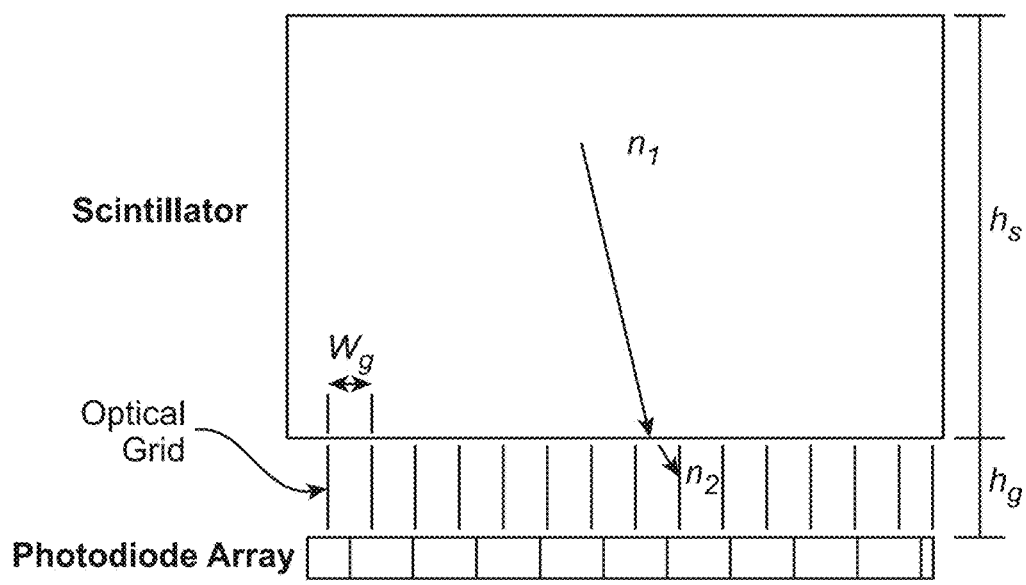
FIG. 17 illustrates increase in an effective aspect ratio of a grid based on n1 and n2.

A further design consideration relates to the indices of refraction of the optical grid capillary material (e.g. air) and the scintillator material (e.g. CsI). According to Snell's Law, if the scintillator index of refraction ($n_1$) is greater than the capillary material index of refraction ($n_2$), the effective aspect ratio of the grid $\alpha'$ is increased in the following manner (FIG. 17):

$$\alpha' = \alpha n_1/n_2.$$

Figure 18:
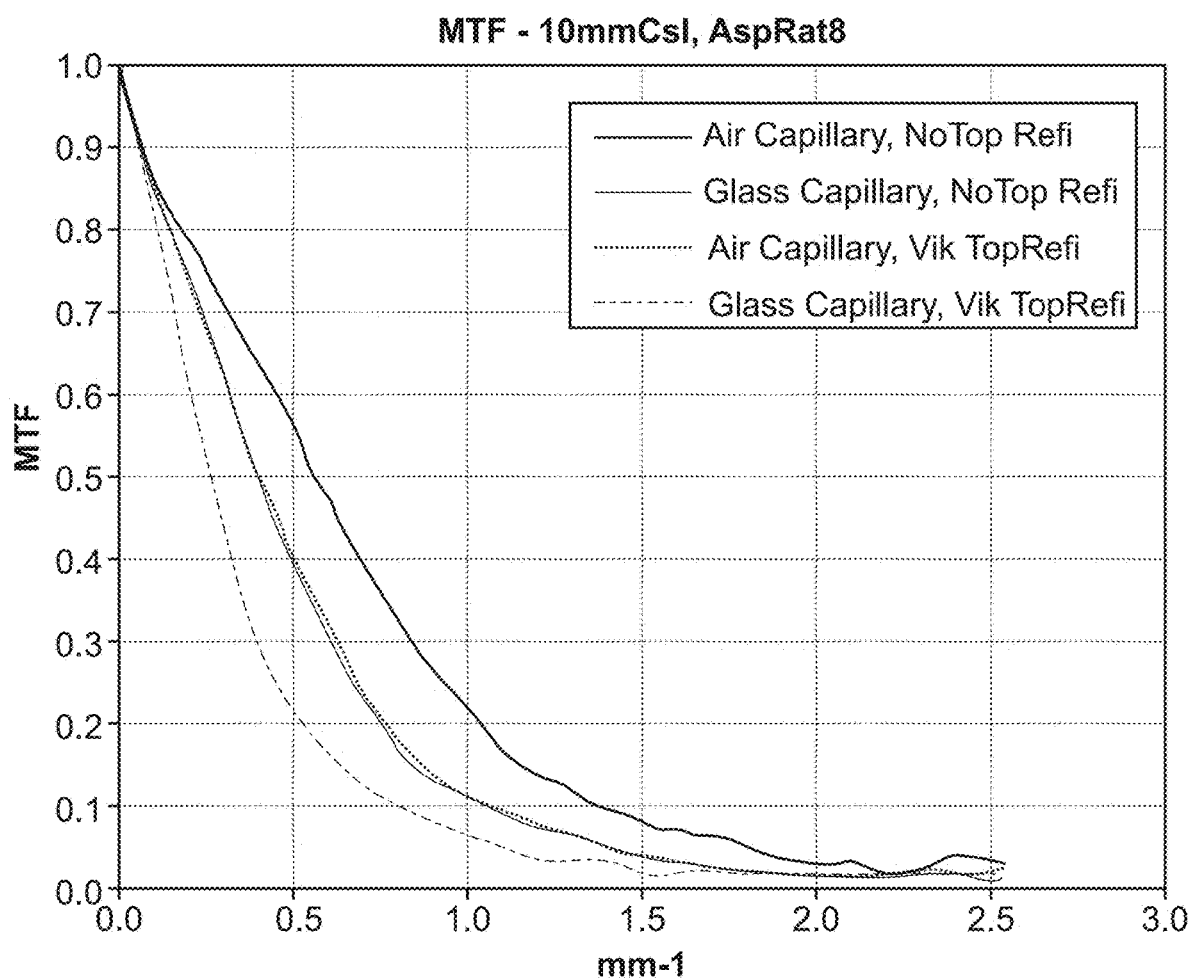
FIG. 18 shows how index of refraction of a capillary material can impact MTF.

FIG. 18 shows how the index of refraction of the capillary material can impact spatial resolution (MTF).

B. Optical Photon Fluence

The loss of photons may be readily calculated by evaluating the area cast by the optical source onto the photodiode array.

For a source originating at height h, the ShadowArea is given by $$\text{ShadowArea} = (2h/\alpha)^{2/} = (h/\alpha)^1$$

when assuming a 2-D separable triangular distribution function t(x) as described above.

The DetectedPhotonFraction may be defined as the ratio of the ShadowArea to the area of the spherical surface defined by the radius h multiplied by the fill factor F:

$$DetectedPhotonFraction = F \cdot \text{ShadowArea}/4\pi h^2 = \left(\frac{w_g}{w_g + w_l}\right)^2 \cdot \frac{1}{4\pi\alpha^2}$$

The loss of optical photons may be significant. For example, for a grid with an 80% fill factor and an aspect ratio of 5:1, only 0.25% of the original optical photons that were produced are detected. The implications of the large quantum sink on electronic noise floor requirements for the configuration proposed as shown in FIG. 10 was analyzed.

Several simulations of DQE(f) were performed using GEANT4. The NPS was first calculated assuming no electronic noise sources and a given detector/optical grid geometry. The NPS was then adjusted according to assumed fluence and electronic noise magnitudes.

The following parameters may be used:

E=Radiation exposure to the detector (uGy).

Fluence=Incident fluence (gamma/mm$^2$), which may be calculated from E and the spectrum.

NoiseRMS$_e$=RMS electronic noise per detector pixel, which is unique to the hardware used. The electronic noise power spectrum NPS$_e$ may be assumed to be white and uncorrelated with other noise sources.

For a quasi-ideal detector (i.e. no electronic noise), the zero-frequency detective quantum efficiency, DQE0$_q$ is obtained from the Swank formula and the quantum efficiency (QE):

$$DQE0_q = QE \cdot \frac{M1^2}{M2 \cdot M0}$$

where M0, M1 and M2 are respectively the zeroth, first and second moments of the simulated pulse height spectrum.

Correspondingly, the zero-frequency value of the quasi-ideal noise power spectrum NPS$_q$(0) is the reciprocal of DQE$_q$(0).

For a given input fluence, the quasi-ideal SNR$^2$ in the pixel domain is related to a quantity "noise-equivalent gammas per pixel", which is defined as:

NoiseEquivalentGammasPerPixel'DQE0$_R$·Fluence·PixelPitch$MM^1$ where PixelPitchMM is the photodiode array pixel pitch (mm).

To convert NoiseEquivalentGammasPerPixel to units that can be compared to the electronic noise floor, we need to compute the size of the received signal by first tallying the number of optical photons received per pixel:

OpticalPhotonsPerPixel=M1·QE·Fluence·PixelPitch$MM^2$

Here, M1 (the first moment of the pulse height spectrum) is the average number of detected optical photons per detected gamma.

Given that the quasi-ideal detector SNR for each pixel is equal to the $$\sqrt{NoiseEquivalentGammasPerPixel}$$

then if we assume that one optical photon generates 1 electron-hole pair, the quasi-ideal zero-frequency readout noise NoiseRMS$_R$ is given by $$NoiseRMS_q = \frac{OpticalPhotonsPerPixel}{\sqrt{NoiseEquivalentGammasPerPixel}}$$

The above provides the fundamental information necessary to determine, for a given dose, the magnitude of the electronic noise power spectrum NPS$_e$ relative to the magnitude of quasi-ideal detector noise power spectrum NPS$_q$:

$$NPS_e = NPS_q(0)\left(\frac{NoiseRMS_e}{NoiseRMS_q}\right)^2$$

where the electronic noise is assumed to be white, and is thus constant as a function of spatial frequency.

As shown by the above equation, the more optical photons that are received and converted into the electron hole pairs, the lower the electronic NPS relative to the quasi-ideal NPS.

The total NPS is given by

NPS(f)=NPS$_q$(f)+NPS$_e$

Hence, the effect of the electronic noise is to boost the total NPS by a constant amount across all frequency values.

Figure 19:
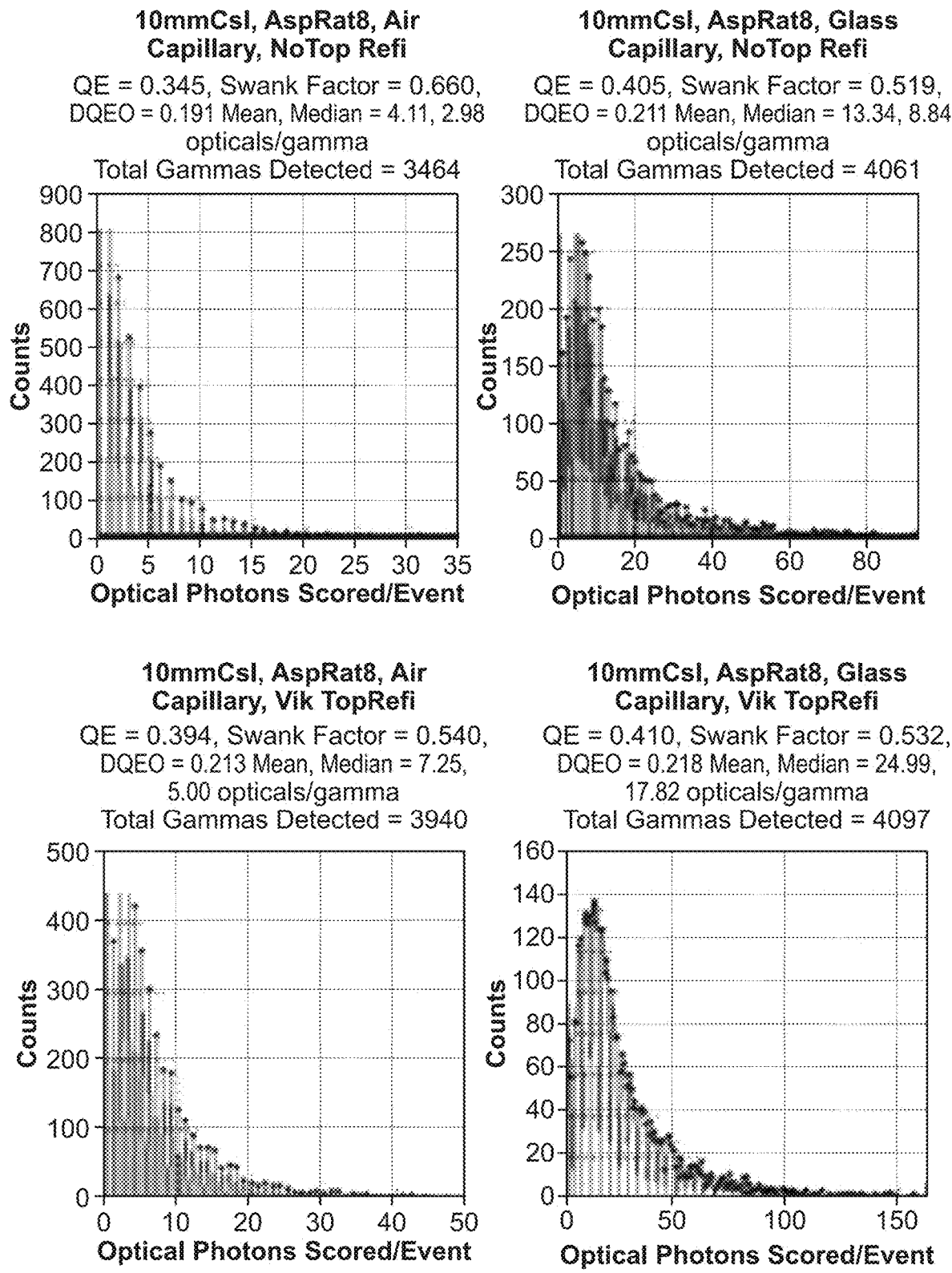
FIG. 19 shows that the price for increased MTF is reduced optical fluence.

As shown in FIG. 19, for a given scintillator 202 and optical grid 280, the optical yield is affected by the grid capillary core material (air vs. glass), as well as the top reflector material. The figure shows simulated pulse height spectra for a 2.5 MV beam and a 10 mm CsI slab with an 8:1 optical grid aspect ratio (which is the same data as for FIG. 18). The most counts are received with a top reflector and a glass capillary core. However, as shown in FIG. 18, the spatial resolution MTF is reduced in these cases. Notably, the "Glass capillary/no top reflector" MTT is the same as the "Air Capillary/Vik Top Reflector" case, implying the former yields almost twice as many counts, which may be preferred.

Figure 20:
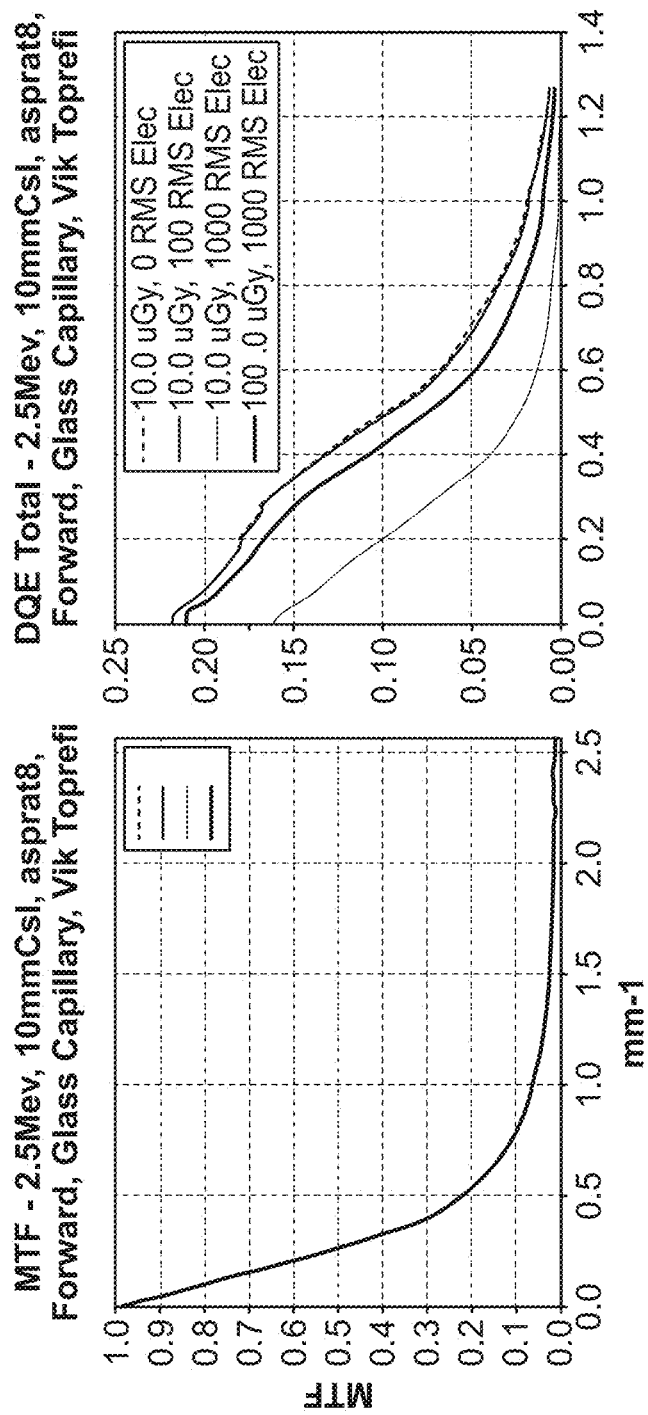
FIG. 20 shows MTF and DQE as a function of electronic noise and imager dose.

Spatial resolution and DQE may also be associated with electronic noise and imager dose. FIG. 20 shows spatial resolution MTF and DQE as functions of electronic noise and imager dose.

Figure 21A:
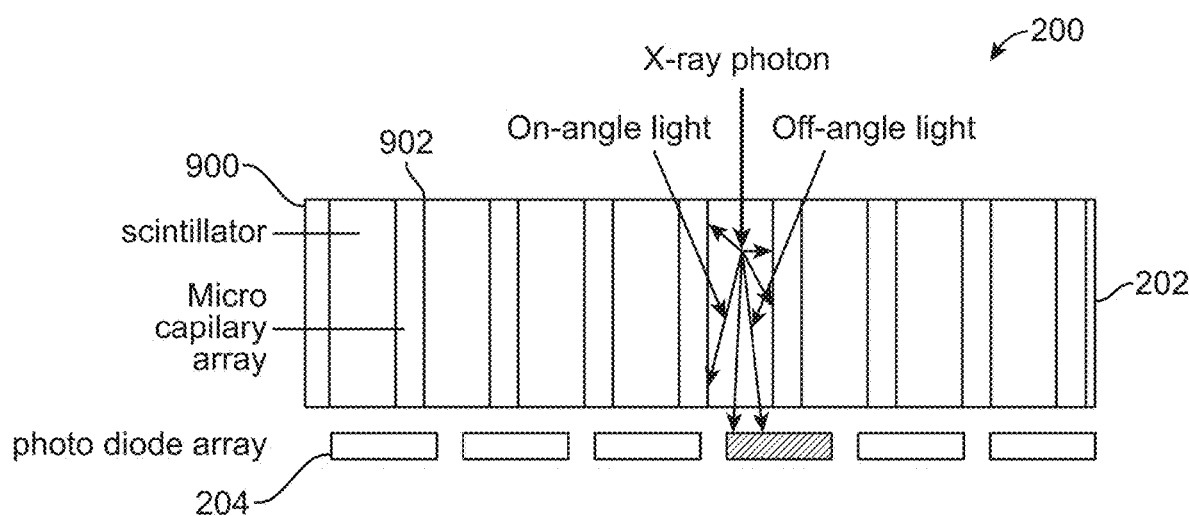
FIG. 21A illustrates another imaging device.
Figure 21B:
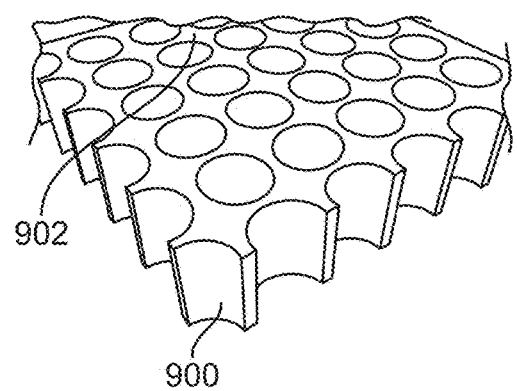
FIG. 21B illustrates an example of a capillary array.

It should be noted that the configuration of the imaging device is not limited to the examples described previously, and that the imaging device may have other configurations in other embodiments. For example, in other embodiments, scintillator material may be incorporated into the optical grid. FIG. 21A shows an imaging device 200 having a capillary array 900 with a plurality of capillaries 902 (e.g., openings, channels, etc.), a scintillator layer 202, and photo diode array 204. The capillary array 900 itself is shown in FIG. 21B. The scintillator materials of the scintillator layer 202 is placed (e.g., in form of scintillator blocks) inside the capillaries such that walls of the capillary array 900 separate and isolate individual scintillator material that is within each capillary 902. The capillary array 900 functions as an optical grid, and is configured to prevent light from a scintillator material in one capillary 902 to pass to an adjacent capillary 902. As shown in FIG. 21A, the capillary array 900 with scintillator materials (scintillator blocks) is at an operative position with respect to the photo diode array 204. In the illustrated example, the capillary array 900 is located above the photo diode array 204. In another example, the capillary array 900 may be located below the photo diode array 204. The pitch of the capillary array 900 may be in an order of the pixel pitch of the underlying photo diode array 204. In some cases, the pitch of the capillary array 900 may be smaller than that of the photo diode array 204. Making the capillary array pitch different from that of the photo diode array removes the requirement to precisely register the capillary array 900 to the photo diode array 204. Precisely aligning the capillary array 900 and the photo diode array 204 may be a difficult and expensive manufacturing process, which may be avoided by making the two pitches different.

In other cases, the pitch of the capillary array 900 may be equal to that of the photo diode array 204. For example, by integrating the manufacturing of the capillary array 900 into a TFT manufacturing process, the capillary array 900 can be exactly aligned to the pixel structure.

In the above example, each capillary 902 in the capillary array 900 has a circular cross section. In other examples, the cross section of each capillary 902 may have a square, a rectangular, an elliptical, a triangular, a honeycomb, or any of other shapes.

During use, x-ray radiation reaches the scintillator layer 202 of the imaging device 200. The scintillator materials in the capillaries of the capillary array 900 generate light in response to the x-ray radiation. In each capillary 902, the generated light travels towards one of the photodiode element in the photo diode array 204. In particular, some light (i.e., the "on-angle" light) that is not blocked by the walls of the capillary array 900 will travel towards and reach a photodiode element. Other light (i.e., the "off-angle" light) may be blocked by the walls of the capillary array 900, which prevent the light from reaching an adjacent capillary 902. From an imaging content perspective, only light rays that reach the photo diode array 204 at a substantially orthogonal angle (e.g., 90°±25, and more preferably 90°±15°, and even more preferably 90°±10°, and even more preferably 90°±5°) relative to the plane of the photo diode array 204 are of interest. Light rays entering at other angles are generated by events that do not belong to that particular pixel. By providing the capillary array 900 that is only transparent to light rays substantially orthogonal to the plane of the photo diode array 204, only the events that are directly above a particular photodiode element contribute to the signal. This results in reduction of blurring effect.

The above configuration of the imaging device 200 is advantageous because it improves image quality. In some cases, the imaging device 200 may be configured (e.g., by having a thicker scintillator) to provide MeV imaging. In such cases, the capillary array reduces the blurring artifact associated with the use of thicker scintillator layer. In other embodiments, the imaging device 200 may be configured to provide other energy level of imaging, such as keV imaging.

Figure 22:
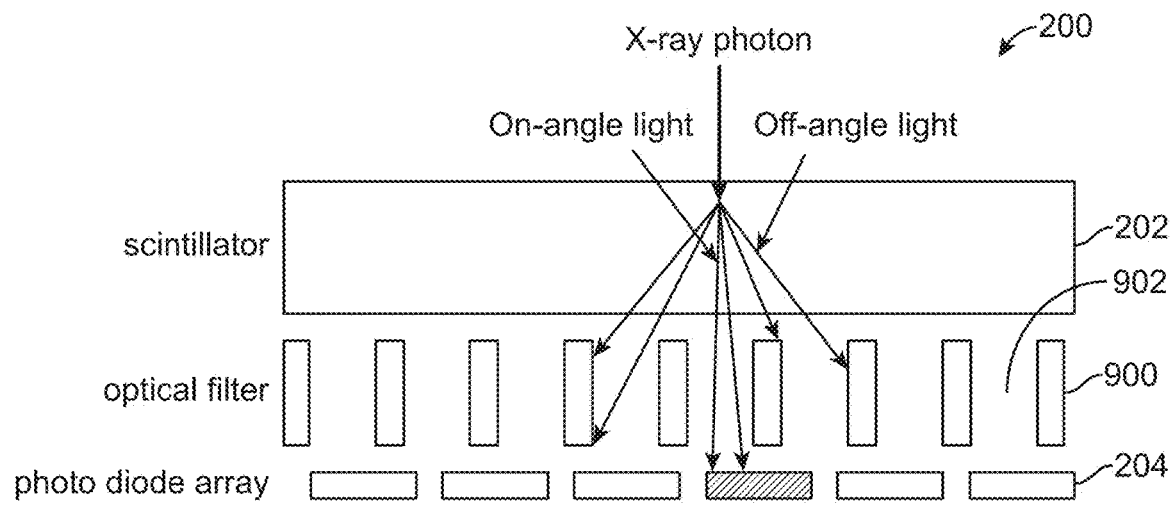
FIG. 22 illustrates another imaging device.

In other embodiments, the capillary array may not have any scintillator materials therein. In such cases, the capillary array may function as a light angle filter. FIG. 22 shows an imaging device 200 having a scintillator layer 202, a capillary array 900 that functions as an optical filter (e.g., a light angle filter), and a photo diode array 204. The imaging device 200 is the same as that in FIG. 21A, except that the material in the scintillator layer 202 is not integrated in the capillaries 902 of the capillary array 900. As shown in FIG. 22, the capillary array 900 functions as an optical filter, and is coupled between the scintillator layer 202 and the photo diode layer 204. The capillary array 900 includes capillaries that function as filter openings for allowing passage of light therethrough. In some cases, the filter openings contain air. In other cases, each filter opening may include glass, lens, plastics, optical fiber(s), etc., for transmitting light through the filter opening, thereby allowing light to pass through the filter opening.

During use, x-ray radiation reaches the scintillator layer 202 of the imaging device 200. The scintillator layer 202 generates light in response to the x-ray radiation. The generated light enters from one side of the capillary array 900. Some of the light (i.e., the "on-angle" light) that is not blocked by the walls of the capillary array 900 will exit the other side of the capillary array 900 and will travel towards and reach a photodiode element. The remaining light (i.e., the "off-angle" light) may be blocked by the walls of the capillary array 900, which prevent the light from reaching an adjacent capillary 902. From an imaging content perspective, only light rays that reach the photo diode array 204 at a substantially orthogonal angle (e.g., 90°±25°), and more preferably 90°±15°, and even more preferably 90°±10°, and even more preferably 90°±5°) relative to the plane of the photo diode array 204 are of interest. Light rays entering at other angles are generated by events that do not belong to that particular pixel. In some cases, the thickness of the capillary array 900 may be configured to provide certain desired light filtering efficiency. For example, thinner capillary array 900 may provide less de-blurring effect, while thicker capillary array 900 may provide more de-blurring effect. By providing the capillary array 900 that is only transparent to light rays substantially orthogonal to the plane of the photo diode array 204, only the events that are directly above a particular photodiode element contribute to the signal. This results in reduction of blurring effect.

Figure 23:
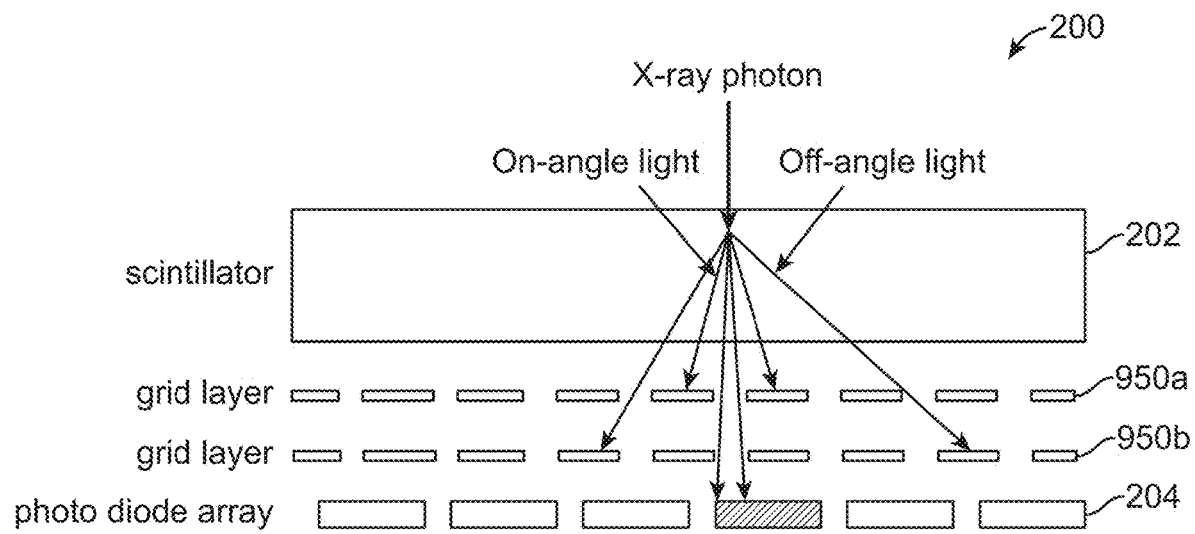
FIG. 23 illustrates another imaging device.

In further embodiments, the imaging device 200 may include multiple optical filters. FIG. 23 illustrates another imaging device 200. The imaging device 200 includes a scintillator layer 202, a first optical filter 950a, a second optical filter 950b, and a photo diode array 204. As shown in the figure, the optical filters 950a, 950b are coupled between the scintillator layer 202 and the photo diode layer 204. As shown in the figure, the pitch of the optical filters 950a, 950b is different from the pitch of the photodiode elements in the photo diode array 204. The pitch of the optical filters 950a, 950b is smaller than the pitch of the photodiode elements in the photo diode array 204. Making the optical filter pitch different from that of the photo diode array removes the requirement to precisely register the optical filters 950a, 950b to the photo diode array 204.

In other embodiments, the pitch of the optical filter elements may be equal to the pitch of the photodiode elements in the photo diode array 204. For example, by integrating the manufacturing of the optical filter(s) into a TFT manufacturing process, the optical filter(s) can be exactly aligned to the pixel structure.

In some embodiments, the openings in the respective optical filters 950a, 950b, and the distance between the two optical filters 950a, 950b may be chosen to let enough light through while filtering the incident light rays as uniform as possible, independent of the location they are generated at. In some cases, the size of each opening in the first optical filter 950a may be different from the size of each opening in the second optical filter 950b. In other cases, the size of each opening in the first optical filter 950a may be the same as the size of each opening in the second optical filter 950b. Also, in some embodiments, the spacing between adjacent openings in the first filter 950a may be different from the spacing between adjacent openings in the second filter 950b. In other embodiments, the spacing between adjacent openings in the first filter 950a may be the same as the spacing between adjacent openings in the second filter 950b.

In some cases, the second optical filter 950b may be manufactured directly on top of the photo diode array 204.

Also, in some embodiments, the first optical filter 950a may be coupled to a first side of a glass, and the second optical filter 950b may be coupled to a second side of the glass that is opposite from the first side. This way, the spacing between the first optical filter 950a and the second optical filter 950b equals to the thickness of the glass.

During use, x-ray radiation reaches the scintillator layer 202 of the imaging device 200. The scintillator layer 202 generates light in response to the x-ray radiation. The generated light enters from one side of the first optical filter 950a. Some of the light (i.e., the "on-angle" light) that is travelling at a substantially orthogonal angle relative to the plane of the first optical filter 950a will exit the other side of the first optical filter 950a. Such "on-angle" light will enter from one side of the second optical filter 950b, and will exit the other side of the second optical filter 950b. The light will then travel towards and reach a photodiode element. Some of the remaining light (i.e., the "off-angle" light) may be blocked by the first optical filter 950a, which prevents the light from reaching the photo diode array 204. Other remaining light that is not blocked by the first optical filter 950b will be blocked by the second optical filter 950b, which prevents the light from reaching the photo diode array 204. Thus, the optical filters 950a, 950b function as light angle filters. From an imaging content perspective, only light rays that reach the optical filter 950a/950b at a substantially orthogonal angle (e.g., 90°±25°, and more preferably 90°±15°, and even more preferably 90°±10°, and even more preferably 90°±5°) relative to the plane of the optical filter 950a/950b are of interest. Light rays entering at other angles are generated by events that do not belong to that particular pixel. By providing the optical filters 950a, 950b that, in combination, are only transparent to light rays substantially orthogonal to the plane of the optical filter 950a/950b, only the events that are directly above a particular photodiode element contribute to the signal. This results in reduction of blurring effect.

Figure 24:
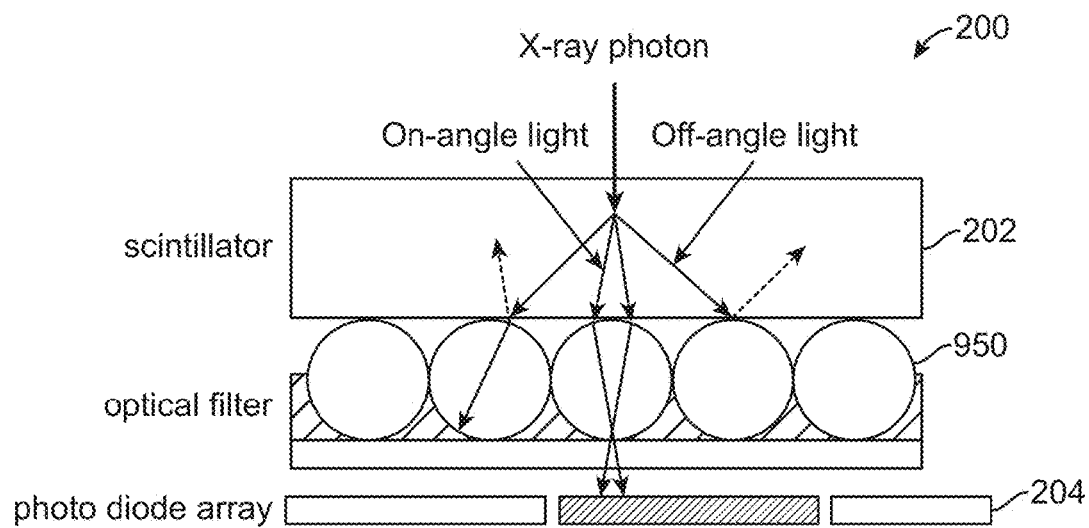
FIG. 24 illustrates another imaging device.

In other embodiments, the imaging device 200 may include other component(s) that functions as optical filter for filtering light at certain angles. FIG. 24 shows another imaging device 200 that includes a scintillator layer 202, an optical filter 950 that is implemented using rear projection foils, and a photo diode array 204. The optical filter 950 is coupled between the scintillator layer 202 and the photo diode array 204. As shown in the figure, the pitch of the optical filter elements is different from the pitch of the photodiode elements in the photo diode array 204. The pitch of the optical filter elements is smaller than the pitch of the photodiode elements in the photo diode array 204. Making the optical filter pitch different from that of the photo diode array removes the requirement to precisely register the optical filter 950 to the photo diode array 204. Precisely aligning the optical filter 950 and the photo diode array 204 may be a difficult and expensive manufacturing process, which may be avoided by making the two pitches different.

In other embodiments, the pitch of the optical filter elements may be equal to the pitch of the photodiode elements in the photo diode array 204. For example, by integrating the manufacturing of the optical filter 950 into a TFT manufacturing process, the optical filter 950 can be exactly aligned to the pixel structure.

During use, x-ray radiation reaches the scintillator layer 202 of the imaging device 200. The scintillator layer 202 generates light in response to the x-ray radiation. The generated light enters from one side of the optical filter 950. Some of the light (i.e., the "on-angle" light) that is travelling at a substantially orthogonal angle relative to the plane of the optical filter 950 will exit the other side of the optical filter 950 and will travel towards and reach a photodiode element. The remaining light (i.e., the "off-angle" light) may be absorbed and/or reflected by the optical filter 950, which prevents the light from reaching the photo diode array 204. Thus, the optical filter 950 functions as a light angle filter. From an imaging content perspective, only light rays that reach the optical filter 950 at a substantially orthogonal angle (e.g., 90°±25°, and more preferably 90°±15°, and even more preferably 90°±10°, and even more preferably 90°±5°) relative to the plane of the optical filter 950 are of interest. Light rays entering at other angles are generated by events that do not belong to that particular pixel. By providing the optical filter 950 that is only transparent to light rays substantially orthogonal to the plane of the optical filter 950, only the events that are directly above a particular photodiode element contribute to the signal. This results in reduction of blurring effect.

Figure 25:
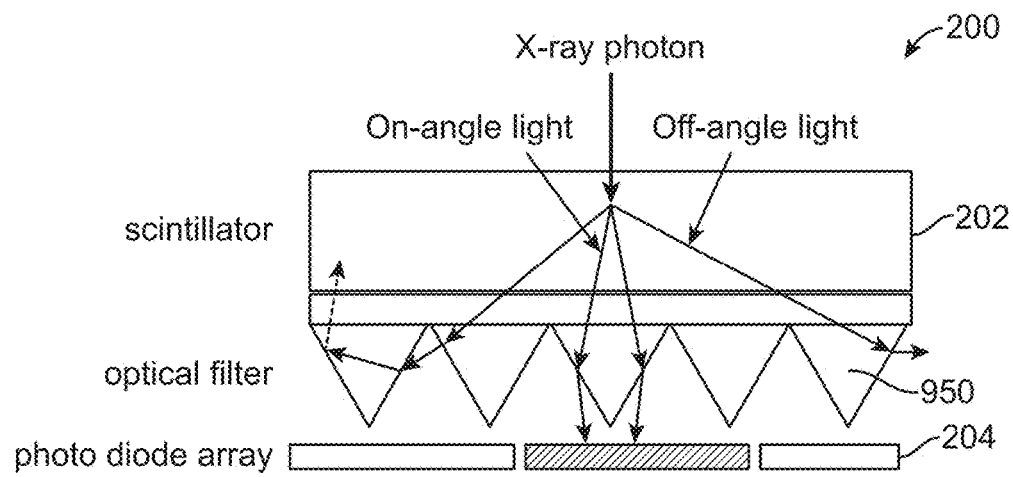
FIG. 25 illustrates another imaging device.

FIG. 25 shows another imaging device 200 that includes a scintillator layer 202, an optical filter 950 that is implemented using prism structure, and a photo diode array 204. The prism structure in the optical filter 950 utilizes refraction and reflection to filter light at certain angles. In particular, the prism structure refracts light within a viewing cone towards the photo diode array 204. Light outside this cone angle is reflected back. The optical filter 950 is coupled between the scintillator layer 202 and the photo diode array 204. As shown in the figure, the pitch of the optical filter elements is different from the pitch of the photodiode elements in the photo diode array 204. The pitch of the optical filter elements is smaller than the pitch of the photodiode elements in the photo diode array 204. Making the optical filter pitch different from that of the photo diode array removes the requirement to precisely register the optical filter 950 to the photo diode array 204. Precisely aligning the optical filter 950 and the photo diode array 204 may be a difficult and expensive manufacturing process, which may be avoided by making the two pitches different.

In other embodiments, the pitch of the optical filter elements may be equal to the pitch of the photodiode elements in the photo diode array 204. For example, by integrating the manufacturing of the capillary array 900 into a TFT manufacturing process, the capillary array 900 can be exactly aligned to the pixel structure.

During use, x-ray radiation reaches the scintillator layer 202 of the imaging device 200. The scintillator layer 202 generates light in response to the x-ray radiation. The generated light enters from one side of the optical filter 950. Some of the light (i.e., the "on-angle" light) that is travelling at a substantially orthogonal angle relative to the plane of the optical filter 950 will exit the other side of the optical filter 950 and will travel towards and reach a photodiode element. The remaining light (i.e., the "off-angle" light) may be reflected away by the prism structure in the optical filter 950, which prevents the light from reaching the photo diode array 204. In some cases, the reflected light may be recycled until it exits the prism structure at the proper angle. Thus, the optical filter 950 functions as a light angle filter. From an imaging content perspective, only light rays that reach the optical filter 950 at a substantially orthogonal angle (e.g., 90°±25°, and more preferably 90°±15°, and even more preferably 90°±10°, and even more preferably 90°±5°) relative to the plane of the optical filter 950 are of interest. Light rays entering at other angles are generated by events that do not belong to that particular pixel. By providing the optical filter 950 that is only transparent to light rays substantially orthogonal to the plane of the optical filter 950, only the events that are directly above a particular photodiode element contribute to the signal. This results in reduction of blurring effect.

In still further embodiments, the optical filter between the scintillator layer 202 and the photo diode array 204 may be implemented using a group of small fiber optic segments that are glued together to form an array of small light pipes. The number of fiber optic segments may be in the order of thousands, hundreds of thousands, or millions. In some cases, the aperture and the index of refraction of such light pipes may be configured to define the angle of light filtering.

Figure 26:
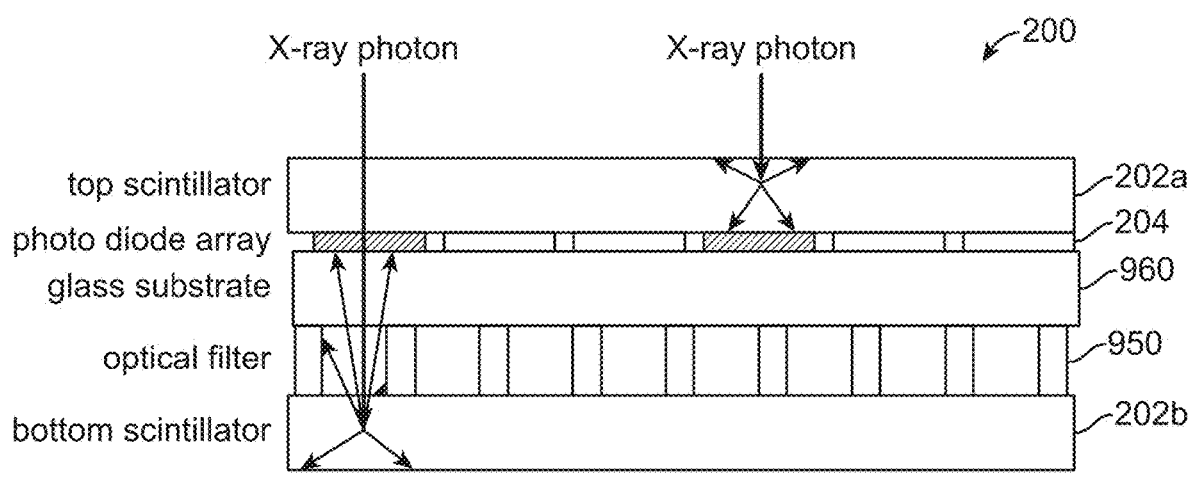
FIG. 26 illustrates another imaging device.

FIG. 26 shows another imaging device 200 in accordance with other embodiments. The imaging device 200 includes a first scintillator layer 202a, a photo diode array 204 having a plurality of photodiode elements, a glass substrate 960, an optical filter 950, and a second scintillator layer 202b. As shown in the figure, the optical filter 950 is coupled between the glass substrate 960 and the second scintillator layer 202b. The optical filter 950 is configured to allow "on-angle" light generated by the second scintillator 202b to be transmitted towards the photo diode array 204, while blocking the "off-angle" light.

In the illustrated embodiments, the material in the second scintillator layer 202b is not integrated in the capillaries of the optical filter 950. In other embodiments, the material in the second scintillator layer 202b may be integrated in the capillaries of the optical filter 950 (like that described with reference to FIG. 21A). Also, in the illustrated embodiments of FIG. 26, the imaging device 200 has one optical filter 950. In other embodiments, the imaging device 200 may include a second optical filter (like that described with reference to FIG. 23).

Furthermore, in other embodiments, the imaging device 200 may include one or more additional optical filter for filtering light generated from the first scintillator layer 202a. The additional optical filter(s) may be coupled between the first scintillator layer 202a and the photo diode array 204. In the cases in which there are two additional optical filters between the first scintillator layer 202a and the photo diode array 204, they may have the configuration like that shown in FIG. 23.

In other embodiments, instead of the optical filter 950, the imaging device 200 may include a transparent metal (e.g., ITO) coupled between the glass substrate and the second scintillator layer 202b.

It should be noted that the term "first scintillator layer" and the term "second scintillator layer" need not refer to the top scintillator layer and the bottom scintillator layer, respectively. For example, in other cases, the first scintillator layer may refer to the bottom scintillator layer, and the second scintillator layer may refer to the top scintillator layer.

Returning to FIG. 26, during use, x-ray radiation reaches the first scintillator layer 202a of the imaging device 200. The first scintillator layer 202a generates light in response to the x-ray radiation. The generated light then exits the first scintillator layer 202a and reaches the photo diode array 204 where electrical signals are generated in response to the detected light. Some of the radiation will go through the photo diode array, the glass substrate, and the optical filter 950 to reach the second scintillator layer 202b. The second scintillator layer 202b generates light in response to this x-ray radiation. The light from the second scintillator layer 202b then enters the optical filter 950 from the bottom side of the optical filter 950, and is filtered by the optical filter 950. Some of the light (i.e., the "on-angle" light) that is not blocked by the walls of the optical filter 950 will exit the other side of the optical filter 950 and will travel towards and reach a photodiode element at the photo diode array 204. The remaining light (i.e., the "off-angle" light) may be blocked by the walls of the optical filter 950, which prevent the light from reaching the photo diode array 204. From an imaging content perspective, only light rays that reach the photo diode array 204 at a substantially orthogonal angle (e.g., 90°±25°, and more preferably 90°±15°, and even more preferably 90°±10°, and even more preferably 90°±5°) relative to the plane of the photo diode array 204 are of interest. Light rays entering at other angles are generated by events that do not belong to that particular pixel. By providing the optical filter 950 that is only transparent to light rays substantially orthogonal to the plane of the photo diode array 204, only the events that are directly above a particular photodiode element contribute to the signal. This results in reduction of blurring effect. As shown in the figure, the filtered light from the optical filter 950 reaches the photo diode array 204, which generates signals in response to the light from the second scintillator array 202b. Thus, the photo diode array 204 is configured to detect light from a first (top) side and also from a second (bottom) side that is opposite from the first side. This configuration is advantageous because it allows the photo diode array 204 to receive additional light resulted from radiation that has passed through the photo diode array 204 initially (i.e., radiation that would otherwise be un-useable).

In any of the embodiments described herein, angle filtering may be achieved by selecting an index of refraction of the involved materials, such that only light impinging the optical filter from the desired angle range passes through.

Also, in any of the embodiments described herein, the optical filtering feature may be used for imagers based on direct conversion techniques.

Figure 27:
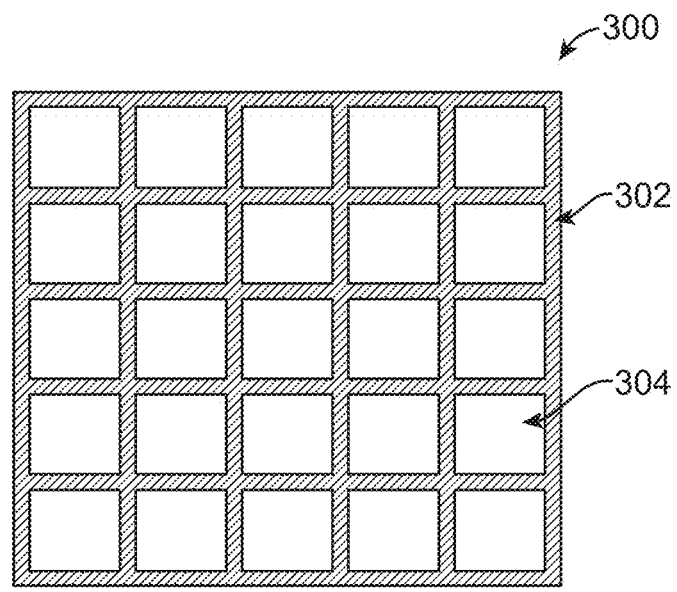
FIG. 27 illustrates another imaging device.

FIG. 27 illustrates another imaging device 300. The imaging device 300 includes a grid 302 defining a plurality of voids that are filled with oxyhalide material 304 (e.g., oxyhalide glass). Such device provides small independent pixels assembled in a two dimensional array. The spatial resolution of such device comes from the discontinuity in the light path from pixel to pixel. The grid 302 may be made from metal, plastic, ceramic, or any other materials that is appropriate for separating the oxyhalide material 304. The pixelated oxyhalide material 304 may be achieved using different techniques. In some embodiments, a slab of the oxyhalide material may be sliced into desired pixel size. In other embodiments, the oxyhalide material may be casted into a mold having a desired pixel size. In further embodiments, the oxyhalide material may be drawn into long fibers which are then cut to desired length. The grid 302 with the oxyhalide material 304 may be placed in operative position relative to a detector, such as a flat panel imager (located underneath the grid 302), which is not shown. In the illustrated embodiments, the grid 302 with the oxyhalide material 304 is coupled to the detector. In some embodiments, the grid 302 with the oxyalide material 304 may be considered to be parts of a scintillating layer.

During use, the oxyhalide materials 304 in at least some of the voids in the grid 302 receive radiation, and generate light in response to the received radiation. Light emitted by scintillating events within the oxyhalide material 304 is directed by the wall of the grid 302 towards the flat panel imager. The directed light then reaches the detector, which generates electrical signals in response to light received by the detector.

Figure 28:
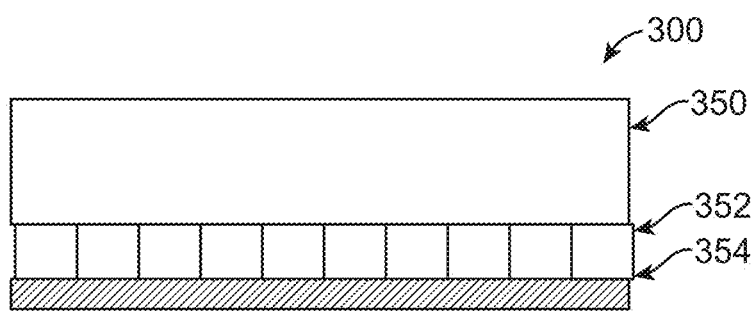
FIG. 28 illustrates another imaging device.

In other embodiments, instead of having the oxyhalide material 304 in separate pixelated form, the imaging device 300 may have a slab of oxyhalide material (e.g., oxyhalide glass). FIG. 28 illustrates another imaging device 300 that includes a slab of oxyhalide material 350, an optical grid 352 aligned with the oxyhalide material 350, and detector (e.g., a flat panel imager) 354 aligned with the optical grid 352. Thus, the optical grid 352 is coupled between the slab of oxyhalide material 350 and the detector 354. In some embodiments, the optical grid 352 may be an array of fiber-optics. In other embodiments, the optical grid 352 may be a plate with holes spaced at a desired pitch to achieve a desired spatial resolution.

During use, the slab of oxyhalide material 350 receives radiation, and generates light in response to the received radiation. Light emitted by scintillating events within the oxyhalide glass is collimated by the optical grid 352. The collimated light then reaches the detector 354, which generates electrical signals in response to light received by the detector 354.

The embodiments described with reference to FIGS. 27-28 are advantageous over use of thick single crystal arrays. In particular, the use of oxyhalide material in the imaging device is less expensive to implement than that of single crystal arrays, and also provides sufficient dose efficiency compared to that achieved using thick single crystal arrays. The use of oxyhalide material is also advantageous over imaging devices that use phosphor screens, or x-ray sensitive film, because the oxyhalide material provides higher efficiency compared to imaging devices that use phosphor screens and x-ray sensitive film, resulting in less dose delivered during imaging.

The features described with reference to FIGS. 27-28 may be implemented for the imaging devices described in FIGS. 2A-2D, 6A-6C, 8A-8D, 9, 10, 17, 21A-21B, and 22-26. For example, the scintillator layer in any of these figures may be implemented using oxyhalide material like the block of oxyhalide material described with reference to FIG. 28. Alternatively, the scintillator layer in any of the above figures may be implemented using a grid with oxyhalide material between walls of the grid, like that described with reference to FIG. 27.

It should be noted that the embodiments of the imaging device described herein are not limited to portal imagers, and that any of the embodiments of the imaging device (such as any of the embodiments of FIGS. 2A-2D, 6A-6C, 8B-8E, 9, 10, 21-26) described herein may be used with diagnostic radiation beam.

In the above embodiments, various features have been described with reference to medical imaging. In other embodiments, any or all of the features described herein may be implemented for security application. For example, in some embodiments, any of the imagers described herein may be employed for cargo screening.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. An imaging device, comprising:
a scintillator layer configured to receive radiation;
an array of photodiode elements, wherein the scintillator layer is configured to receive the radiation after the radiation has passed through the array of photodiode elements; and
an additional scintillator layer, wherein the array of photodiode elements is located between the scintillator layer and the additional scintillator layer;
wherein the layer of photodiode elements is configured to generate signals in response to photons from both the scintillator layer and the additional scintillator layer, and wherein the photons from both the scintillator layer and the additional scintillator layer are based on a same imaging beam comprising the radiation; and
wherein the imaging device further comprises a substrate supporting the array of photodiode elements, wherein parts, not entireties, of respective ones of the photodiode elements are located beneath a surface of the substrate.

2. The imaging device of claim 1, wherein the substrate comprises a glass substrate, wherein the array of photodiode elements is secured to the glass substrate, wherein the glass substrate has a first side and an opposite second side, the first side being closer to a radiation source than the second side.

3. The imaging device of claim 2, wherein the array of photodiode elements is located closer to the first side of the glass substrate than the second side.

4. The imaging device of claim 2, wherein the array of photodiode elements is located closer to the second side of the glass substrate than the first side.

5. The imaging device of claim 1, further comprising a layer of focusing elements located between the array of photodiode elements and the scintillator layer.

6. The imaging device of claim 5, wherein the layer of focusing elements comprises a fiber optic array.

7. The imaging device of claim 6, wherein one or more sides of the scintillator layer are beveled.

8. The imaging device of claim 5, wherein the layer of focusing elements comprises a brightness enhancement film (BEF).

9. The imaging device of claim 1, wherein the scintillator layer comprises an array of scintillator elements, and at least two of the scintillator elements are separated by an air gap.

10. The imaging device of claim 9, wherein the air gap extends from a first side of the scintillator layer to a second side of the scintillator layer.

11. The imaging device of claim 9, wherein the at least two of the scintillator elements are separated by an additional air gap, wherein the air gap extends from a first side of the scintillator layer, and the additional air gap extends from a second side of the scintillator layer.

12. The imaging device of claim 1, wherein the scintillator layer comprises an array of scintillator elements, and at least two of the scintillator elements are separated by a wall that is configured to reflect photons.

13. The imaging device of claim 12, wherein the wall has a photon-reflectivity that varies through a thickness of the scintillator layer.

14. The imaging device of claim 1, wherein the scintillator layer has a first plane and the additional scintillator layer has a second plane, and the scintillator layer and the additional scintillator layer are arranged next to each other so that the first plane and the second plane form a non-zero angle relative to each other.

15. The imaging device of claim 14, wherein the photodiode elements are arranged in a flat plane, and wherein the imaging device further comprises fiber optics coupling the respective scintillator elements in the scintillator layer and in the additional scintillator layer to the respective photodiode elements.

16. The imaging device of claim 1, wherein the scintillator layer is non-pixelated.

17. The imaging device of claim 16, further comprising an optical grid coupled to the scintillator layer.

18. The imaging device of claim 17, wherein the optical grid comprises a one-dimensional grid.

19. The imaging device of claim 17, wherein the optical grid comprises a two-dimensional grid.

20. The imaging device of claim 17, wherein the optical grid comprises reflecting walls or a device with a variation in index of refraction for internal reflection.

21. The imaging device of claim 17, wherein the optical grid comprises metalized mylar.

22. The imaging device of claim 1, further comprising a plate coupled to the scintillator layer.

23. An imaging device, comprising:
a scintillator layer;
an array of photodiode elements; wherein the scintillator layer is configured to receive radiation after it has passed through the array of photodiode elements; and
an additional scintillator layer, wherein the array of photodiode elements is located between the scintillator layer and the additional scintillator layer;
wherein the array of photodiode elements comprises only a single layer of photodiode elements located between the scintillator layer and the additional scintillator layer, and the single layer of photodiode elements is configured to generate signals in response to photons from both the scintillator layer and the additional scintillator layer, and wherein the scintillator layer and the additional scintillator layer are configured to operate simultaneously with a same radiation source providing the radiation; and
wherein the imaging device further comprises a substrate supporting the array of photodiode elements, wherein parts, not entireties, of respective ones of the photodiode elements are located beneath a surface of the substrate.

24. An imaging device, comprising:
a non-pixelated scintillator layer configured to receive radiation and generate photons in response to the radiation;
an array of photodiode elements configured to generate electrical signals in response to the photons; and
an optical grid located between the non-pixelated scintillator layer and the array of photodiode elements;
wherein the imaging device further comprises an additional non-pixelated scintillator layer, and an additional optical grid, wherein the additional non-pixelated scintillator layer and the additional optical grid are located between the optical grid and the array of photodiode elements; and
wherein the imaging device further comprises a substrate supporting the array of photodiode elements, wherein parts, not entireties, of respective ones of the photodiode elements are located beneath a surface of the substrate.

25. The imaging device of claim 24, wherein the optical grid comprises a one-dimensional grid.

26. The imaging device of claim 24, wherein the optical grid comprises a two-dimensional grid.

27. The imaging device of claim 24, wherein the optical grid comprises reflecting walls or a device with a variation in index of refraction for internal reflection.

28. The imaging device of claim 24, wherein the optical grid comprises metalized mylar.

29. The imaging device of claim 24, wherein the scintillator layer is configured to receive radiation that has passed through the array of photodiode elements.

30. The imaging device of claim 24, wherein the scintillator layer is configured to receive radiation before the array of photodiode elements.

31. The imaging device of claim 24, wherein the optical grid and the additional optical grid have different respective grid pitches.

32. The imaging device of claim 24, wherein the scintillator layer has a first index of refraction, and the optical grid has a second index of refraction that is less than the first index of refraction.

\* \* \* \* \*